US011108837B2

(12) United States Patent
Ge et al.

(10) Patent No.: US 11,108,837 B2
(45) Date of Patent: Aug. 31, 2021

(54) MEDIA DOWNLINK TRANSMISSION CONTROL METHOD AND RELATED DEVICE

(71) Applicant: Huawei Technologies Co., Ltd., Shenzhen (CN)

(72) Inventors: Cuili Ge, Beijing (CN); Yanmei Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/505,191

(22) Filed: Jul. 8, 2019

(65) Prior Publication Data

US 2019/0334969 A1 Oct. 31, 2019

Related U.S. Application Data

(63) Continuation of application No. PCT/CN2017/070678, filed on Jan. 9, 2017.

(51) Int. Cl.
*G06F 15/16* (2006.01)
*H04L 29/06* (2006.01)

(52) U.S. Cl.
CPC ...... *H04L 65/4092* (2013.01); *H04L 65/1089* (2013.01); *H04L 65/1093* (2013.01)

(58) Field of Classification Search
CPC . H04L 65/1089; H04L 29/06; H04L 65/1093; H04L 65/4092; H04L 65/4061; H04L 65/604

See application file for complete search history.

(56) References Cited

U.S. PATENT DOCUMENTS

| | | | |
|---|---|---|---|
| 7,324,555 B1 * | 1/2008 | Chen | H04N 7/17336 348/E5.008 |
| 7,395,481 B2 * | 7/2008 | Chintada | H04L 1/1848 714/748 |
| 7,782,875 B2 * | 8/2010 | Mikkola | H04L 29/06027 370/400 |
| 7,809,388 B1 * | 10/2010 | Othmer | H04M 1/6505 455/426.1 |
| 9,392,576 B2 * | 7/2016 | Drozt | H04W 72/005 |

(Continued)

FOREIGN PATENT DOCUMENTS

| | | |
|---|---|---|
| CN | 1937778 A | 3/2007 |
| CN | 101145900 A | 3/2008 |

(Continued)

OTHER PUBLICATIONS

Airbus DS SLC, "Pseudo-CR on Unicast resources optimization", 3GPP TSG-SA WG6 Meeting #14, S6-161380, Reno, Nevada, USA, Nov. 14-18, 2016, 2 pages.

(Continued)

*Primary Examiner* — Cheikh T Ndiaye
(74) *Attorney, Agent, or Firm* — Slater Matsil, LLP

(57) ABSTRACT

A media downlink transmission control method and a related device, the method including receiving a remote media reception message sent by an authorized terminal, where the remote media reception message includes a target user identifier, determining a first target media stream based on the remote media reception message, and sending the first target media stream to a destination terminal corresponding to the target user identifier.

14 Claims, 13 Drawing Sheets

(56) References Cited

U.S. PATENT DOCUMENTS

| | | | |
|---|---|---|---|
| 9,466,035 B2 | 10/2016 | Merriman et al. | |
| 10,462,807 B2* | 10/2019 | Wallentin | H04W 72/1231 |
| 2004/0024902 A1* | 2/2004 | Mikkola | H04L 29/06027 |
| | | | 709/238 |
| 2006/0294243 A1* | 12/2006 | Kuure | H04L 63/104 |
| | | | 709/227 |
| 2012/0170501 A1* | 7/2012 | Drozt | H04W 72/005 |
| | | | 370/312 |
| 2013/0094367 A1 | 4/2013 | Zou et al. | |
| 2014/0177437 A1* | 6/2014 | Korus | H04W 76/45 |
| | | | 370/230 |
| 2014/0192691 A1 | 7/2014 | Vyas et al. | |
| 2014/0301378 A1 | 10/2014 | Xu | |
| 2015/0117397 A1* | 4/2015 | Ofir | H04L 65/4076 |
| | | | 370/331 |
| 2015/0249868 A1 | 9/2015 | Wang et al. | |
| 2016/0192187 A1 | 6/2016 | Tao | |
| 2016/0270103 A1* | 9/2016 | Jiang | H04L 5/1469 |

FOREIGN PATENT DOCUMENTS

| | | |
|---|---|---|
| CN | 101547191 A | 9/2009 |
| CN | 102186261 A | 9/2011 |
| CN | 102882795 A | 1/2013 |
| CN | 102982116 A | 3/2013 |
| CN | 103079231 A | 5/2013 |
| CN | 103702147 A | 4/2014 |
| CN | 105376194 A | 3/2016 |
| CN | 105392040 A | 3/2016 |
| CN | 105812219 A | 7/2016 |
| CN | 106230911 A | 12/2016 |
| EP | 2296334 A1 | 3/2011 |
| JP | 2007274150 A | 10/2007 |
| JP | 2009514284 A | 4/2009 |
| JP | 2010531122 A | 9/2010 |
| KR | 20050020942 A | 3/2005 |
| KR | 20150033664 A | 4/2015 |

OTHER PUBLICATIONS

IEEE Std 802.11™-2016 (Revision of IEEE Std 802.11-2012), Part 11: Wireless LAN Medium Access Control (MAC) and Physical Layer (PHY) Specifications, IEEE Computer Society, Sponsored by the LAN/MAN Standards, 3534 pages.

"3rd Generation Partnership Project; Technical Specification Group Services and System Aspects; Functional architecture and information flows to support Mission Critical Video(MCVideo); Stage 2 (Release 14)," 3GPP TS 23.281 V14.0.0, Dec. 2016, 137 pages.

Budka, K.C., et al., "Public safety mission critical voice services over LTE," Bell Labs Technical Journal, Wiley CA, US, vol. 16, No. 3, Dec. 1, 2011 pp. 133-149.

* cited by examiner

MEDIA DOWNLINK TRANSMISSION CONTROL METHOD AND RELATED DEVICE

CROSS-REFERENCE TO RELATED APPLICATIONS

This application is a continuation of International Application No. PCT/CN2017/070678, filed on Jan. 9, 2017, the disclosure of which is hereby incorporated by reference in its entirety.

TECHNICAL FIELD

This application relates to the field of electronic technologies, and in particular, to a media downlink transmission control method and a related device.

BACKGROUND

A mission critical service is a media transmission service used for public security application and general commercial application, for example, in a public security system. The mission critical service supports 1-to-N group communication. In one group communication, transmission of media data may be controlled by an authorized user such as a dispatcher. The dispatcher is a user who has a special permission, and may be a group member of one or more groups, or may be a superuser. In the prior art, there is only a mechanism in which an authorized user controls sending of uplink media data by a group user, and there is no mechanism in which the authorized user controls receiving of downlink media data by the group user. For example, the authorized user can control a particular group user to send target media data to a media control server, but cannot control one or more specific group users to receive the target media data. In an existing technical solution, pertinence and flexibility of the authorized user's control over media data transmission are relatively poor.

SUMMARY

This application provides a media downlink transmission control method and a related device, so as to make an authorized user's control over media data transmission more pertinent, and improve flexibility of media downlink transmission control.

According to a first aspect, an embodiment of this application provides a media downlink transmission control method, including receiving a remote media reception message sent by an authorized terminal, where the remote media reception message includes a target user identifier, then, determining a first target media stream based on the remote media reception message, and finally, sending the first target media stream to a destination terminal corresponding to the target user identifier.

In the first aspect, the authorized user may specify a sent first target media stream and a destination terminal receiving the first target media stream, so as to send a specific media stream to a terminal of a specific communication participant.

In a first possible implementation of the first aspect, before the sending the first target media stream to a destination terminal corresponding to the target user identifier, the method further includes determining that a quantity of media streams currently received by the destination terminal is less than a media stream quantity threshold corresponding to the destination terminal.

In a second possible implementation of the first aspect, the remote media reception message further includes a media stream identifier of the first target media stream.

In a third possible implementation of the first aspect, before the sending the first target media stream to a destination terminal corresponding to the target user identifier, the method further includes sending a media transmission grant message to a source terminal of the first target media stream, and receiving the first target media stream that is sent by the source terminal of the first target media stream based on the media transmission grant message.

In a fourth possible implementation of the first aspect, before the sending the first target media stream to a destination terminal corresponding to the target user identifier, the method further includes sending a media reception invitation message to the destination terminal, where the media reception invitation message is used to notify the destination terminal to receive the first target media stream, and receiving a media reception request message that is sent by the destination terminal based on the media reception invitation message.

In a fifth possible implementation of the first aspect, after the sending the first target media stream to a destination terminal corresponding to the target user identifier, the method further includes after sending the first target media stream to the destination terminal, sending a media stream transmission completion notification message to the authorized user.

According to a second aspect, an embodiment of this application provides a media downlink transmission control method, including receiving a remote media reception end message sent by an authorized terminal, where the remote media reception end message includes a target user identifier, determining, based on the remote media reception end message, a second target media stream from media streams that are currently sent to a destination terminal corresponding to the target user identifier, and stopping sending the second target media stream to the destination terminal corresponding to the target user identifier.

In the second aspect, the authorized user may specify a second target media stream that stops being transmitted and a destination terminal receiving the second target media stream, so as to stop or suspend transmission of a specific media stream for a terminal of a specific communication participant.

In a first possible implementation of the second aspect, after the stopping sending the second target media stream to the destination terminal corresponding to the target user identifier, the method further includes if a quantity of receiving terminals of the second target media stream is currently less than a first quantity threshold, or a destination user corresponding to the target user identifier is a mandatory user to which the second target media stream is sent, sending a media transmission end message to a source terminal of the second target media stream, where the media transmission end message is used to notify the source terminal of the second target media stream to stop sending the second target media stream.

In a second possible implementation of the second aspect, after the sending a media transmission end message to a source terminal of the second target media stream, the method further includes sending a media stream transmission end notification message to a current receiving terminal of the second target media stream.

In a third possible implementation of the second aspect, the remote media reception end message further includes a media stream identifier of the second target media stream.

In a fourth possible implementation of the second aspect, before the stopping sending the second target media stream to the destination terminal corresponding to the target user identifier, the method further includes sending a media reception end notification message to the destination terminal based on the remote media reception end message, where the media reception end notification message is used to notify the destination terminal that a mission critical service server currently stops sending the second target media stream to the destination terminal.

In a fifth possible implementation of the second aspect, the determining, based on the remote media reception end message, a second target media stream from media streams that are currently sent to a destination terminal corresponding to the target user identifier includes receiving a media reception end request message that is sent by the destination terminal based on the media reception end notification message, where the media reception end request message carries the media stream identifier of the second target media stream, and the stopping sending the second target media stream to the destination terminal corresponding to the target user identifier includes stopping sending the second target media stream to the destination terminal corresponding to the target user identifier, and sending a media reception end response message to the destination terminal.

In a sixth possible implementation of the second aspect, the stopping sending the second target media stream to the destination terminal corresponding to the target user identifier includes storing a transmission context of the second target media stream sent to the destination terminal.

According to a third aspect, an embodiment of this application provides a media downlink transmission control method, including if a quantity of media streams currently received by a destination terminal reaches a media stream quantity threshold corresponding to the destination terminal, determining a third target media stream from the media streams currently sent to the destination terminal, and stopping sending the third target media stream to the destination terminal.

In the third aspect, when the quantity of the received media streams reaches the threshold of the quantity of the media streams, the destination terminal may receive a newly transmitted media stream in a manner of stopping occupying some transmission resources.

In a first possible implementation of the third aspect, before the determining a third target media stream from the media streams currently sent to the destination terminal, the method further includes determining a first target media stream that needs to be sent to the destination terminal.

In a second possible implementation of the third aspect, before the stopping sending the third target media stream to the destination terminal corresponding to the target user identifier, the method further includes sending a media reception preemption message to the destination terminal, where the media reception preemption message carries identification information of the first media stream and identification information of the third media stream, and the media reception preemption message is used to notify the destination terminal that a transmission resource of the third media stream is used to transmit the first media stream.

In a third possible implementation of the third aspect, the determining a third target media stream from the media streams currently sent to the destination terminal includes sending a media reception invitation message to the destination terminal, where the media reception invitation message carries a media stream identifier of the first target media stream, receiving a media reception end request message that is sent by the destination terminal based on the media reception invitation message, and determining, based on the media reception end request message, the third target media stream from the media streams currently sent to the destination terminal.

In a fourth possible implementation of the third aspect, the media reception end request message carries a media stream identifier of the third target media stream.

In a fifth possible implementation of the third aspect, the determining a third target media stream from the media streams currently sent to the destination terminal includes determining, based on a media stream attribute of the first target media stream and media stream attributes of the media streams currently sent to the destination terminal, the third target media stream from the media streams currently sent to the destination terminal.

In a sixth possible implementation of the third aspect, after the stopping sending the third target media stream to the destination terminal corresponding to the target user identifier, the method further includes when it is detected that the quantity of the media streams currently received by the destination terminal is less than the threshold of the quantity of the media streams corresponding to the destination terminal, starting sending the third target media stream to the destination terminal.

In this implementation, when the destination terminal can receive the media stream, a mission critical service server may directly start sending the third target media stream to the destination terminal, reducing signaling overheads, and improving user experience of a destination terminal user.

In a seventh possible implementation of the third aspect, before the starting sending the third target media stream to the destination terminal, the method further includes sending a media transmission grant message to a source terminal of the third target media stream, and receiving the third target media stream that is sent by the source terminal of the third target media stream based on the media transmission grant message.

In an eighth possible implementation of the third aspect, before the starting sending the third target media stream to the destination terminal, the method further includes receiving a media transmission restart message sent by the destination terminal.

In a ninth possible implementation of the third aspect, the media transmission restart message carries the media stream identifier of the third target media stream, and is used to request to start transmitting the third target media stream.

According to a fourth aspect, an embodiment of this application provides a media server, including a receiving module, configured to receive a remote media reception message sent by an authorized terminal, where the remote media reception message includes a target user identifier, a processing module, configured to determine a first target media stream based on the remote media reception message, and a sending module, configured to send the first target media stream to a destination terminal corresponding to the target user identifier.

The media server provided in the fourth aspect of this embodiment of this application is configured to perform the media downlink transmission control method provided in the first aspect of this application. For details, refer to the description of the first aspect in an embodiment of this application, and details are not repeated herein.

In a possible design, a structure of the media server includes a processor and a communications interface, and the processor is configured to perform the media downlink transmission control method provided in the first aspect of this application. Optionally, a memory may further be included, the memory is configured to store application program code that supports the media server in performing the foregoing method, and the processor is configured to execute an application program stored in the memory.

According to a fifth aspect, an embodiment of this application provides a media server, including a receiving module, configured to receive a remote media reception end message sent by an authorized terminal, where the remote media reception message includes a target user identifier, and a processing module, configured to determine, based on the remote media reception end message, a second target media stream from media streams that are currently sent to a destination terminal corresponding to the target user identifier, where the processing module is further configured to stop sending the second target media stream to the destination terminal corresponding to the target user identifier.

The media server provided in the fifth aspect of this embodiment of this application is configured to perform the media downlink transmission control method provided in the second aspect of this application. For details, refer to the description of the second aspect in an embodiment of this application, and details are not repeated herein.

In a possible design, a structure of the media server includes a processor and a communications interface, and the processor is configured to perform the media downlink transmission control method provided in the second aspect of this application. Optionally, a memory may further be included, the memory is configured to store application program code that supports the media server in performing the foregoing method, and the processor is configured to execute an application program stored in the memory.

According to a sixth aspect, an embodiment of this application provides a media server, including a processing module, configured to when a quantity of media streams currently received by the destination terminal reaches a media stream quantity threshold corresponding to the destination terminal, determine a third target media stream from the media streams currently sent to the destination terminal, where the processing module is further configured to stop sending the third target media stream to the destination terminal.

The media server provided in the sixth aspect of this embodiment of this application is configured to perform the media downlink transmission control method provided in the third aspect of this application. For details, refer to the description of the third aspect in an embodiment of this application, and details are not repeated herein.

In a possible design, a structure of the media server includes a processor and a communications interface, and the processor is configured to perform the media downlink transmission control method provided in the third aspect of this application. Optionally, a memory may further be included, the memory is configured to store application program code that supports the media server in performing the foregoing method, and the processor is configured to execute an application program stored in the memory.

According to a seventh aspect, an embodiment of this application provides a computer storage medium, configured to store a computer software instruction used by the foregoing media server. The computer storage medium includes a program designed to perform the foregoing aspects.

In the embodiments of this application, names of the media server, the destination terminal, the receiving terminal, the source terminal, and the authorized terminal constitute no limitation on devices. In an actual implementation, these devices may have other names. These devices fall within the scope of the claims of this application and their equivalent technologies, provided that functions of the devices are similar to those in this application.

DETAILED DESCRIPTION OF ILLUSTRATIVE EMBODIMENTS

The following describes the technical solutions in the embodiments of this application with reference to the accompanying drawings in the embodiments of this application.

Figure 1:
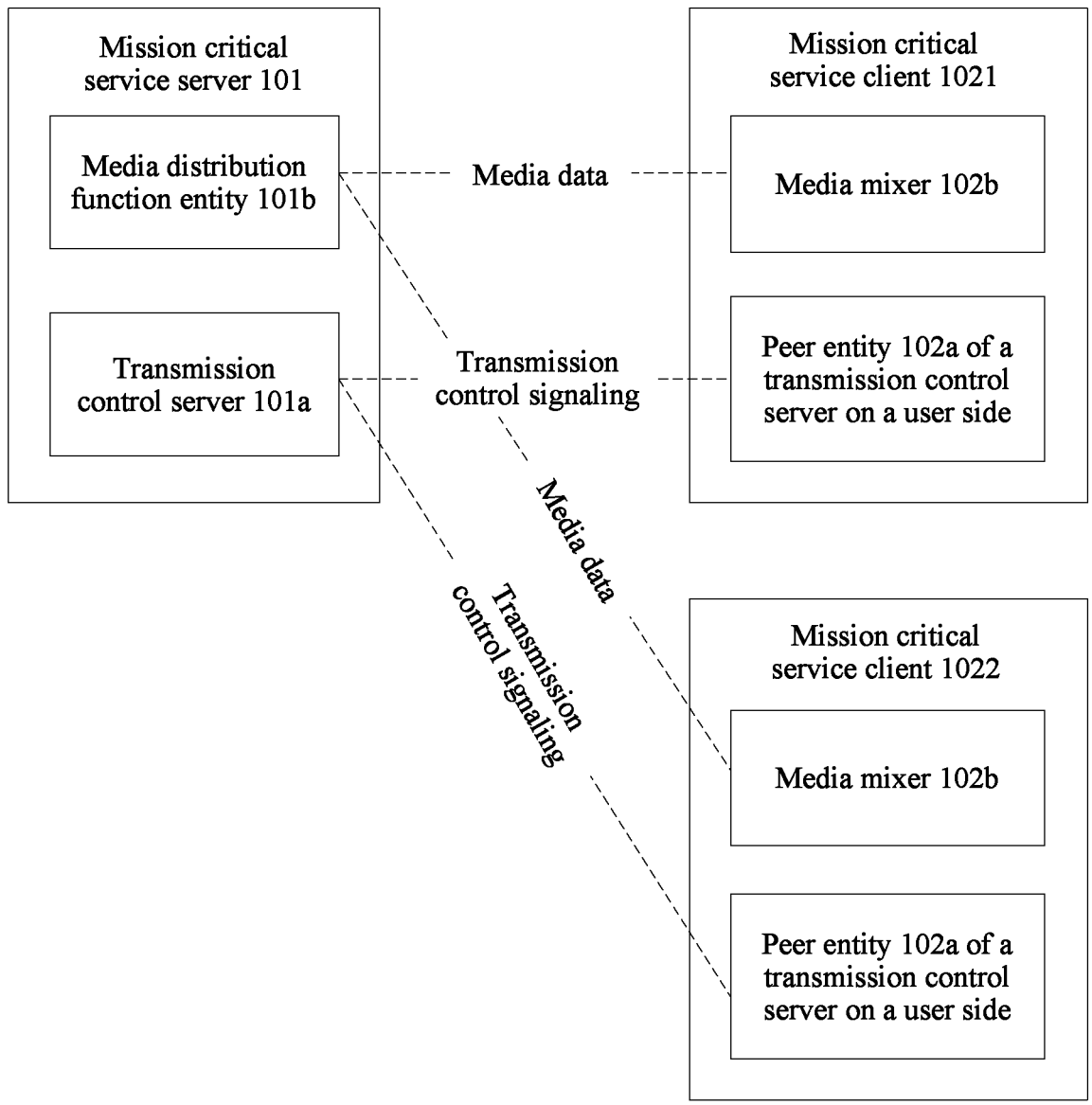
FIG. 1 is a schematic architectural diagram of a mission critical service system according to an embodiment of this application.

The technical solutions in the embodiments of this application are applicable to various systems based on network media transmission. For example, a schematic architectural diagram of a mission critical service system shown in FIG. 1 includes a mission critical service server 101 and at least one mission critical service client 102 (a client 1021 and a client 1022 are shown in FIG. 1). In the system architectural diagram shown in FIG. 1, the mission critical service server 101 is mainly responsible for call control and media control, and is a logical entity. In a specific implementation, the mission critical service server may be a mission-critical push-to-talk (MCPTT) server, a mission critical video (MCVideo) server, a mission critical data (MCData) server, or the like. The mission critical service client 102 is an application layer entity peering with the mission critical service server 101, and is mainly responsible for processing an application layer transaction.

The mission critical service server 101 internally includes a transmission control server 101*a* and a media distribution function entity 101*b*. The transmission control server 101*a* is a media transmission control entity of a media plane, and is responsible for media uplink and/or downlink transmission control. In a specific implementation, in an MCPTT system, the transmission control server 101*a* may be specifically a floor control server. In an MCVideo system, the transmission control server 101*a* may be specifically a transmission control server. In this embodiment of this application, if there is no special description, a function of sending or receiving transmission control signaling by the mission critical service server 101 is performed by the transmission control server 101*a*. The media distribution function entity 101*b* is a logical entity, and is responsible for receiving uplink media data and sending downlink media data. In this embodiment of this application, if there is no special description, a function of sending or receiving media data by the mission critical service server 101 is performed by the media distribution function entity 101*b*.

The mission critical service client 102 internally includes a peer entity 102*a* (Transmission control participant) of the transmission control server on a user side and a media mixer 102*b*. The peer entity 102*a* of the transmission control server on the user side is a media transmission control entity of the media plane, and is responsible for media uplink and/or downlink transmission control. In a specific implementation, in the MCPTT system, the peer entity 102*a* may be a floor control participant. The media mixer 102*b* is a peer entity of the media distribution function entity 101*b* on the user side, and is responsible for receiving the downlink media data and sending the uplink media data.

The execution method described in this embodiment of this application is a method for controlling media data downlink transmission in the system environment shown in FIG. 1, so that an authorized user's control over media data transmission may adapt to more scenario requirements. However, media downlink transmission control methods in some embodiments of this application may be performed by a media server. The media server mentioned herein may be some or all functional entities or units in the foregoing mission critical service server. In other words, the media server in the embodiments of the present invention may be equivalent to the mission critical service server, or be implemented by some entities or units in the mission critical service server.

The following describes a media downlink transmission control method in detail by using the embodiments shown in FIG. 2*a* to FIG. 5*b*.

Figure 2A:
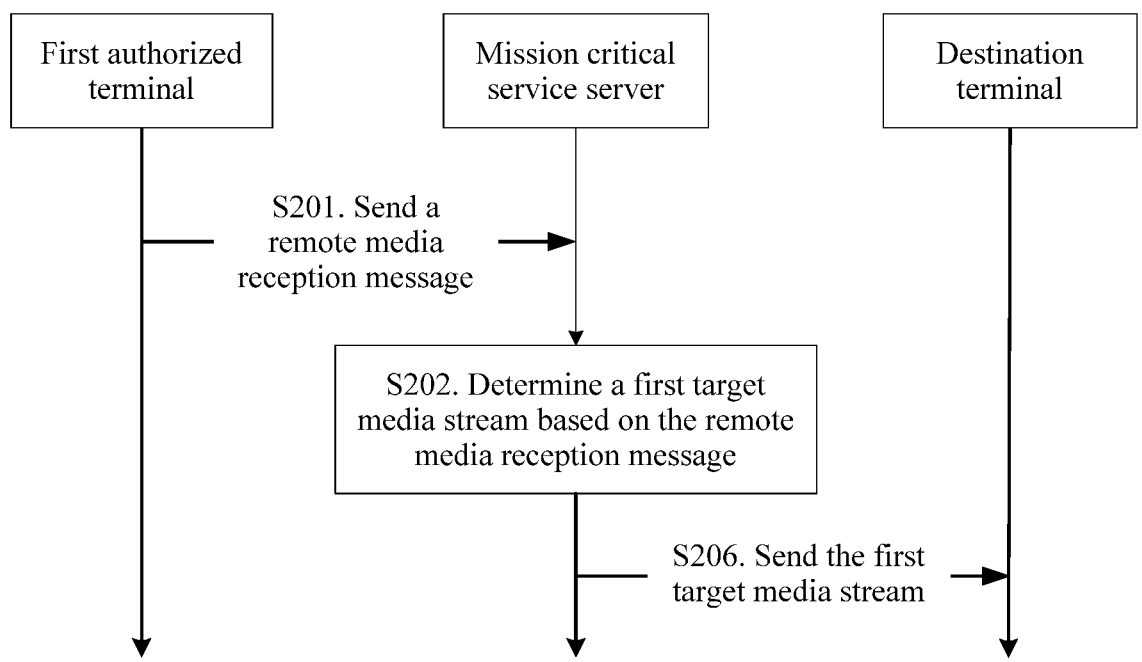
FIG. 2a is a schematic flowchart of a media downlink transmission method according to an embodiment of this application.
Figure 2B:
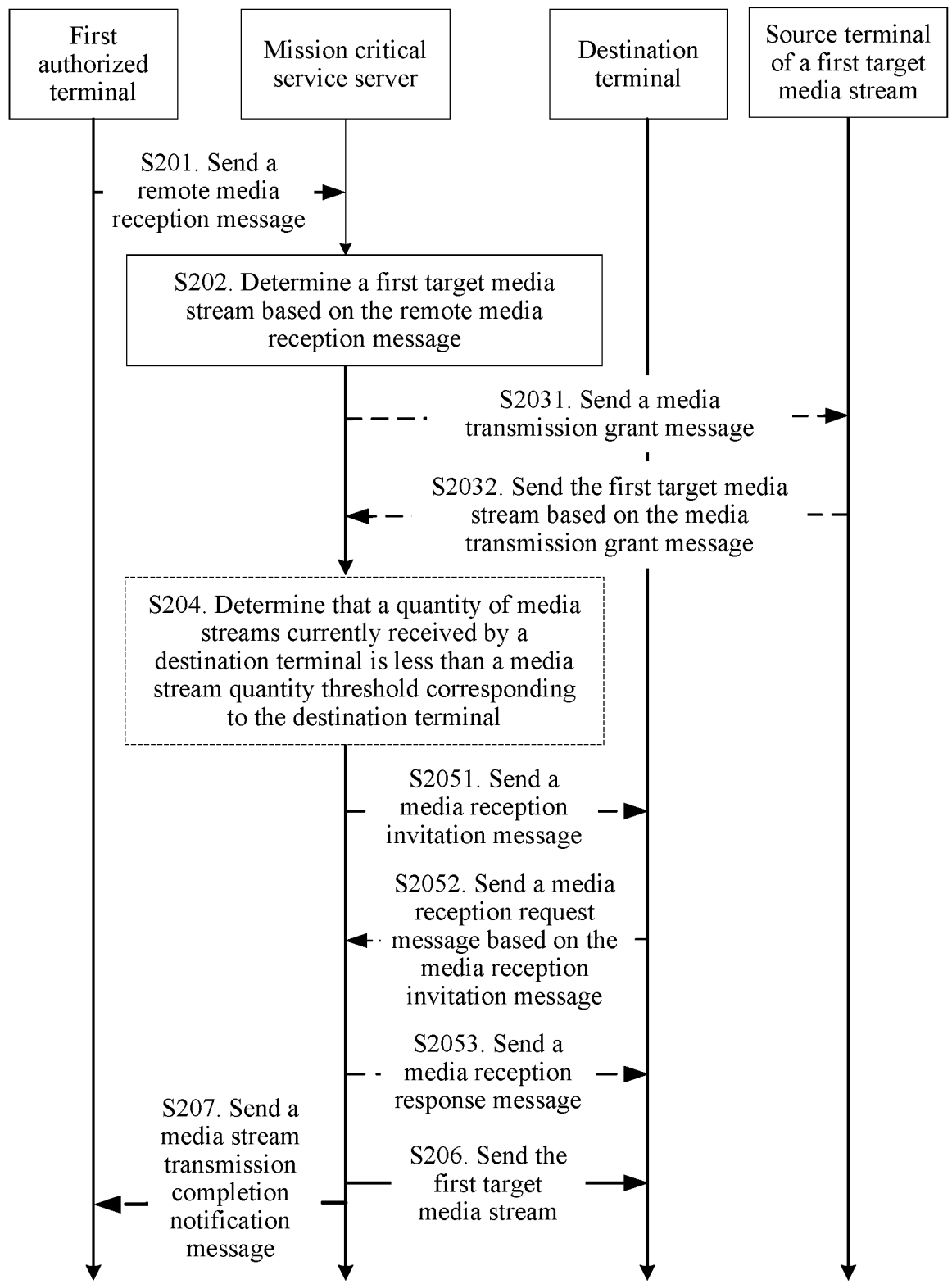
FIG. 2b is a schematic flowchart of another media downlink transmission method according to an embodiment of this application.

Referring to FIG. 2*a* and FIG. 2*b*, FIG. 2*a* and FIG. 2*b* are schematic flowcharts of two media downlink transmission methods according to embodiments of this application. A first authorized terminal provided in this embodiment of this application is a terminal running a mission critical service client corresponding to a first authorized user, and the first authorized user is a user who has a control permission for media resource transmission of a destination terminal corresponding to a target user identifier. The destination terminal is also a terminal running the mission critical service client corresponding to a target user, and the target user is a user role who uses the destination terminal to perform a media transmission service. Compared with the first authorized user, the target user is a controlled user subject to the control permission of the first authorized user in a control scenario. Specifically, the first authorized user may be a user who has a control permission for media resource transmission of a communication group in which the destination terminal is located, or may be a user who has a control permission for media resource transmission of all communication members, and this is not specifically limited herein. Specifically, the method includes the following steps.

Step S201. A first authorized terminal sends a remote media reception message to a mission critical service server, where the remote media reception message includes a target user identifier.

In this embodiment of this application, the remote media reception message is a control message used to instruct the mission critical service server to send media data to the destination terminal corresponding to the target user identifier.

In a specific implementation, when receiving the remote media reception message, the mission critical service server may first perform authentication on a user of the first authorized terminal that sends the message, to be specific, detect whether the user has the control permission for media resource transmission of the destination terminal corresponding to the target user identifier. If the user has the control permission for the media resource transmission of the destination terminal, step S202 is further performed. If the user does not have the control permission for the media resource transmission of the destination terminal, the received remote media reception message is discarded, and a response message may further be returned to the first authorized terminal that sends the message, indicating that the mission critical service server has processed the remote media reception message. If an authorization check fails, the response message indicates an authorization check failure, and the remote media reception message is rejected.

Step S202. The mission critical service server determines a first target media stream based on the remote media reception message.

In a possible implementation scenario, the remote media reception message received by the mission critical service server does not include a media stream identifier that needs to be sent to the destination terminal. Then, the mission critical service server may determine that the first target media stream is all media streams in a communication session for the destination terminal.

In another possible implementation scenario, the remote media reception message includes a media stream identifier of the first target media stream. Then, the mission critical service server may determine that the first target media stream is a media stream corresponding to the media stream identifier carried in the remote media reception message. The media stream identifier of the first target media stream may be one or a combination of the following items: a user identifier of a user who sends the first target media stream, a terminal identifier of a source terminal that sends the first target media stream, or a resource identifier of the first target media stream. For example, the media stream identifier of the first target media stream may be a uniform resource locator (URL) of the first target media stream, a uniform resource identifier (URI) of the first target media stream, an IP address of a sending user of the first target media stream, or an IP address of the source terminal of the first target media stream. It should be noted that there may be one or more first target media streams herein.

Step S206. The mission critical service server sends the first target media stream to the destination terminal corresponding to the target user identifier.

In an optional embodiment, the mission critical service server may find, based on the target user identifier, the destination terminal corresponding to the target user identifier in a currently collected correspondence between a terminal and a user identifier, so as to send the first target media stream to the destination terminal corresponding to the target user identifier.

In an implementation scenario shown in FIG. 2a, the mission critical service server has obtained the first target media stream, and then, the mission critical service server may directly send the first target media stream to the destination terminal. For example, the mission critical service server previously sent the first target media stream to another client and stored media data of the first target media stream, and then, the mission critical service server may directly send the first target media stream to the destination terminal. For another example, the mission critical service server is currently transmitting the first target media stream to another client and therefore stores a transmission context of the first target media stream, and then, the mission critical service server may send the first target media stream to the destination terminal based on the stored transmission context.

In an implementation scenario shown in FIG. 2b, the mission critical service server does not obtain the first target media stream, and then, before step S206, step S203 may further be performed. Step S203 specifically includes the following steps.

S2031. The mission critical service server sends a media transmission grant message to a source terminal of the first target media stream.

The mission critical service server may determine the source terminal of the first target media stream based on the media stream identifier of the first target media stream, in other words, generate a terminal of the first target media stream. Then, the mission critical service server sends the media transmission grant message to the source terminal of the first target media stream. The media transmission grant message is a control message used to instruct the source terminal of the first target media stream to send a media stream to the mission critical service server.

In a possible implementation scenario, the media transmission grant message may carry the media stream identifier of the first target media stream, so as to indicate a specific media stream that needs to be sent by the source terminal of the first target media stream. In another possible implementation scenario, the media transmission grant message may not carry the media stream identifier of the first target media stream. In this case, it may be considered that all media streams generated by the source terminal of the first target media stream are the first target media stream, or the source terminal of the first target media stream generates only one media stream, namely, the first target media stream.

S2032. The source terminal of the first target media stream sends the first target media stream to the mission critical service server based on the media transmission grant message.

After receiving the media transmission grant message, the source terminal of the first target media stream may determine, based on the media transmission grant message, the first target media stream that needs to be sent, so as to send the first target media stream to the mission critical service server.

In a possible implementation scenario, there is an upper limit for a quantity of media streams that can be simultaneously received by the destination terminal. In other words, the quantity of the media streams simultaneously received by the destination terminal is limited. Then, before step S206, step S204 may further be performed, and is specifically as follows.

Step S204. The mission critical service server determines that a quantity of media streams currently received by a destination terminal is less than a media stream quantity threshold corresponding to the destination terminal.

The threshold of the quantity of the media streams corresponding to the destination terminal may be the upper limit, set based on an overall consideration of network performance, destination terminal performance, service quality, and the like, for the quantity of the media streams that can be simultaneously received by the destination terminal. Before sending the first target media stream to the destination terminal corresponding to the target user identifier, the mission critical service server may determine whether the quantity of the media streams currently received by the destination terminal is less than the threshold of the quantity of the media streams corresponding to the destination terminal. If the quantity of the media streams currently received by the destination terminal is less than the threshold of the quantity of the media streams, it indicates that the destination terminal currently may further receive the media stream, and step S206 may be performed. If the quantity of the media streams currently received by the destination terminal is not less than the threshold of the quantity of the media streams, it indicates that the destination terminal currently cannot receive more media streams, and the mission critical service server cannot send the first target media stream to the destination terminal, or can continue sending the first target media stream only in a manner of preempting a transmission resource of another media stream that is being transmitted to the destination terminal, or the like. In a specific implementation, the mission critical service server may determine, by calculating a quantity of media streams received by the destination terminal in a preset time, the quantity of the media streams currently received by the destination terminal, or may determine, based on a quantity of media streams received by the destination terminal at a current detection time point, the quantity of the media streams currently received by the destination terminal, or may determine, by requesting to obtain the quantity of the media streams currently received by the destination terminal from the destination terminal and receiving the quantity of the media streams returned by the destination terminal, the quantity of the media streams currently received by the destination terminal. This is not specifically limited herein.

In a possible implementation scenario, before sending the first target media stream to the destination terminal, the mission critical service server may first notify the destination terminal, so as to instruct the destination terminal to receive the first target media stream. Then, before step S206, step S205 may further be performed, and step S205 specifically includes the following steps.

Step S2051. The mission critical service server sends a media reception invitation message to the destination terminal.

The media reception invitation message is a message used to notify the destination terminal to receive a media stream. In this embodiment of this application, the media reception invitation message may carry the media stream identifier of the first target media stream, so as to instruct the destination terminal to receive the first target media stream that is to be transmitted.

In a possible case, the media reception invitation message may include a forced reception instruction, to be specific, instruct the destination terminal to forcibly receive the first target media stream that is to be sent by the mission critical service server, and the destination terminal further performs step S2052.

In another possible case, the media reception invitation message does not include the forced reception instruction, to be specific, the destination terminal does not need to forcibly receive the first target media stream that is to be sent by the mission critical service server. Then, when receiving the media reception invitation message, the destination terminal may display a prompt box to inquire whether a user of the destination terminal receives the first target media stream. When receiving an acknowledgment reception instruction sent by the user, the destination terminal determines to receive the first target media stream that is to be sent by the mission critical service server, and the destination terminal further performs step S2052. When receiving no acknowledgment reception instruction sent by the user, the destination terminal may return a response message to the mission critical service server, to indicate that the destination terminal rejects to receive the first target media stream, and does not need to perform step S206.

Step S2052. The destination terminal sends a media reception request message to the mission critical service server based on the media reception invitation message.

After determining to receive the first target media stream, the destination terminal may send the media reception request message to the mission critical service server, so as to instruct the mission critical service server to send the first target media stream to the destination terminal, in other words, perform step S206.

Further, after step S2052, the method may further include the following step.

Step S2053. The mission critical service server sends a media reception response message to the destination terminal.

The media reception response message is used to notify the destination terminal that the mission critical service server has responded to the media reception request message sent by the destination terminal.

It should be noted that, according to different situations or requirements, step S203, step S204, and step S205 before step S206 may be separately performed, or some or all of step S203, step S204, and step S205 may be performed in any sequence.

Optionally, after step S206, the method may further include the following step.

Step S207. After sending the first target media stream to the destination terminal, the mission critical service server sends a media stream transmission completion notification message to the first authorized terminal.

The media stream transmission completion notification message is used to notify the first authorized terminal that transmission of the first target media stream is completed, and may carry the media stream identifier of the first target media stream.

In the embodiments shown in FIG. 2a and FIG. 2b, the mission critical service server receives the remote media reception message sent by the authorized terminal, where the remote media reception message includes the target user identifier, then determines the first target media stream based on the remote media reception message, and sends the first target media stream to the destination terminal corresponding to the target user identifier, so that the authorized user may specify a sent first target media stream and a destination terminal receiving the first target media stream, so as to send a specific media stream to a terminal of a specific communication participant.

Figure 3A:
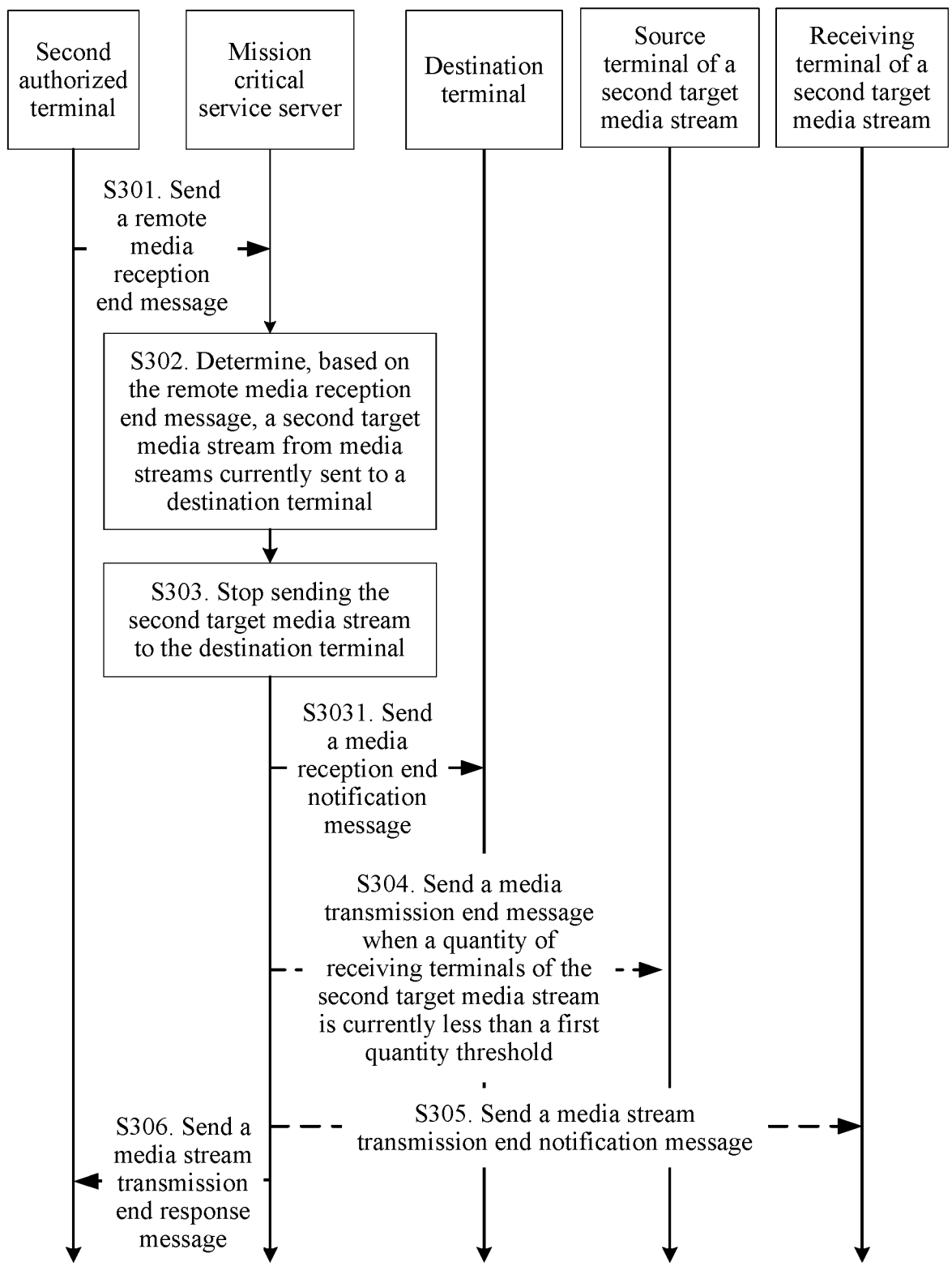
FIG. 3a is a schematic flowchart of a media downlink transmission end method according to an embodiment of this application.
Figure 3B:
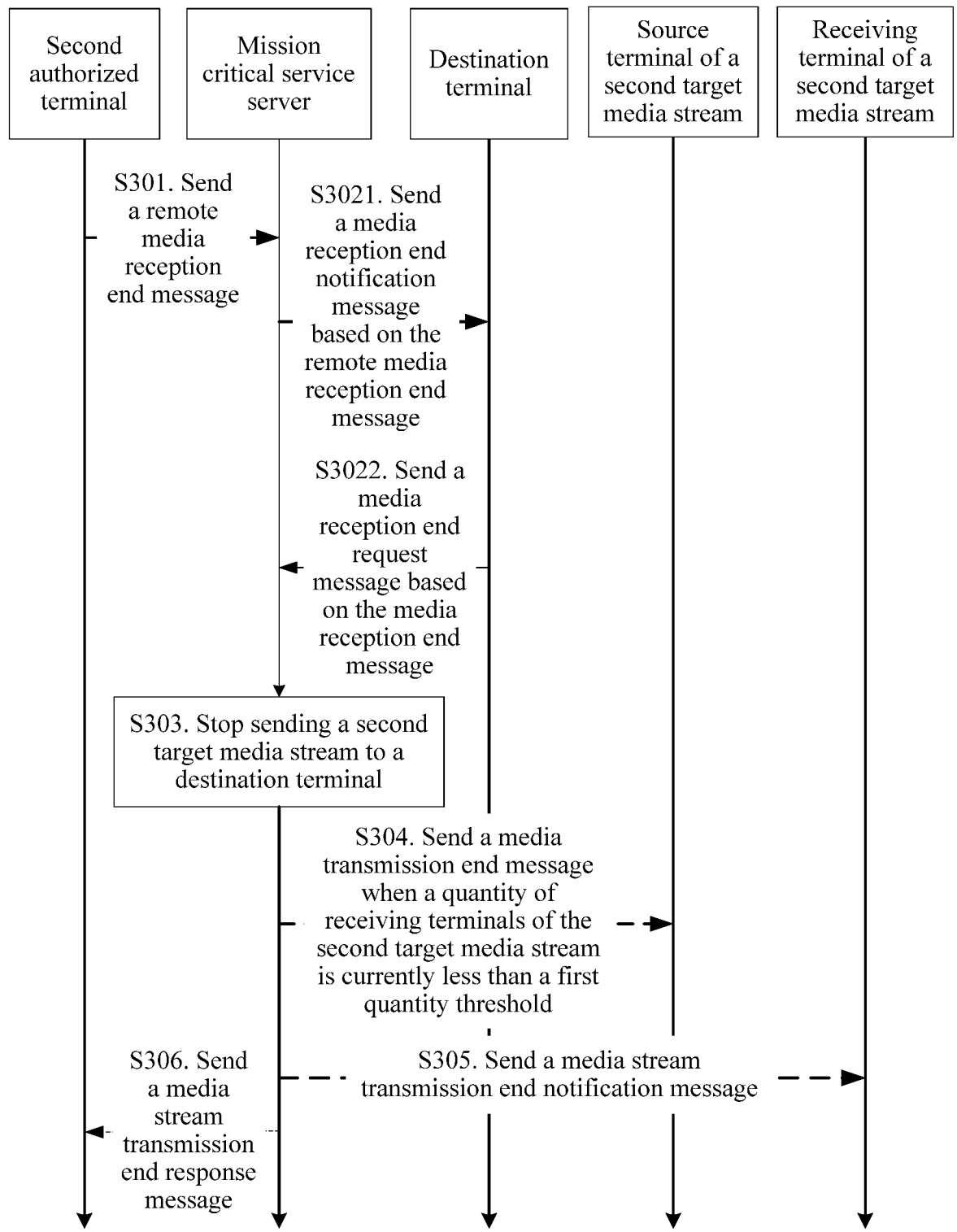
FIG. 3b is a schematic flowchart of another media downlink transmission end method according to an embodiment of this application.

Referring to FIG. 3a and FIG. 3b, FIG. 3a and FIG. 3b are schematic flowcharts of two media downlink transmission end methods according to embodiments of this application. A method provided in this embodiment may be further implemented based on the embodiments shown in FIG. 2a and FIG. 2b, or may be implemented as an independent embodiment. A second authorized terminal provided in this embodiment of this application is a terminal running a mission critical service client corresponding to a second authorized user, and the second authorized user is a user who has a control permission for media resource transmission of a destination terminal corresponding to a target user identifier. The destination terminal is also a terminal running the mission critical service client corresponding to a target user, and the target user is a user role who uses the destination terminal to perform a media transmission service. Compared with the second authorized user, the target user is a controlled user subject to the control permission of the second authorized user in a control scenario. Specifically, the second authorized user may be the first authorized user in an embodiment shown in FIG. 2a or FIG. 2b, or may not be the first authorized user. However, the second authorized user is a user who has a control permission for media resource transmission of a communication group in which the destination terminal is located, or may be a user who has a control permission for media resource transmission of all communication members. Specifically, the method includes the following steps.

Step S301. A second authorized terminal sends a remote media reception end message to a mission critical service server, where the remote media reception message includes a target user identifier.

In this embodiment of this application, the remote media reception end message is a control message used to instruct the mission critical service server to stop sending media data to the destination terminal corresponding to the target user identifier. In a possible case, the remote media reception end message may be used to instruct the mission critical service server to suspend sending the second target media stream to the destination terminal, in other words, instruct the mission critical service server to temporarily suspend a transmission task of transmitting the second target media stream to the destination terminal and to retain a connection to the destination terminal and a transmission context, so that retransmission may be subsequently performed without a need to establish a communication connection and media negotiation again. In another possible case, the remote media reception end message may be used to instruct the mission critical service server to stop sending the second target media stream to the destination terminal, in other words, instruct the mission critical service server to disable the transmission task of transmitting the second target media stream to the destination terminal and to no longer retain the connection to the destination terminal and the transmission context. If retransmission is subsequently needed, the communication connection and the media negotiation need to be established again, for example, the mission critical service server receives a remote media sending message of an authorized terminal or receives a media reception request instruction message of the destination terminal.

In a specific implementation, when receiving the remote media reception end message, the mission critical service server may first perform authentication on a user of the second authorized terminal that sends the message, to be specific, detect whether the user has the control permission for the media resource transmission of the destination terminal corresponding to the target user identifier. If the user has the control permission for the media resource transmission of the destination terminal, step S302 is further performed. If the user does not have the control permission for the media resource transmission of the destination terminal, the received remote media reception end message is discarded, and a response message may further be returned to the second authorized terminal that sends the message, indicating that the mission critical service server has processed the remote media reception end message. If an authorization check fails, the response message indicates an authorization check failure, and the remote media reception end message is rejected.

Step S302. The mission critical service server determines, based on the remote media reception end message, a second target media stream from media streams that are currently sent to a destination terminal corresponding to the target user identifier.

Specifically, the mission critical service server may find, based on the target user identifier, the destination terminal corresponding to the target user identifier in a currently collected correspondence between a terminal and a user identifier, so as to determine, based on the remote media reception end message, the second target media stream from the media streams that are currently sent to the destination terminal corresponding to the target user identifier.

In an implementation scenario shown in FIG. 3a, in a possible case, the remote media reception end message received by the mission critical service server does not include a media stream identifier that needs to stop being sent to the destination terminal. Then, the mission critical service server may determine that the second target media stream is all media streams that are currently sent to the destination terminal corresponding to the target user identifier.

In the implementation scenario shown in FIG. 3a, in another possible case, the remote media reception end message includes a media stream identifier of the second target media stream. Then, the mission critical service server may determine that the second target media stream is a media stream corresponding to the media stream identifier carried in the remote media reception end message. The media stream identifier of the second target media stream may be one or a combination of the following items: a user identifier of a user who sends the second target media stream, a terminal identifier of a source terminal of the second target media stream, or a resource identifier of the second target media stream. For example, the media stream identifier of the second target media stream may be a uniform resource locator (URL) of the second target media stream, a uniform resource identifier (URI) of the second target media stream, an IP address of a sending user of the second target media stream, or an IP address of a sending device of the second target media stream. It should be noted that there may be one or more second target media streams herein.

In an implementation scenario shown in FIG. 3b, a user of the destination terminal may determine whether to stop receiving a media stream and determine a specific media stream that stops being received. Then, step S302 may specifically include the following steps.

Step S3021. The mission critical service server sends a media reception end notification message to the destination terminal based on the remote media reception end message.

The media reception end notification message is a message used to notify the destination terminal that the mission critical service server is to stop sending the media stream to the destination terminal. Optionally, the media reception end message may include a user identifier of the second authorized user, so as to notify the user of the destination terminal that the second authorized user stops sending the media stream.

Step S3022. The destination terminal sends a media reception end request message to the mission critical service server based on the media reception end notification message, where the media reception end request message carries a media stream identifier of the second target media stream.

In a possible case, the remote media reception end message does not carry the media stream identifier of the second target media stream. Then, after receiving the media reception end notification message, the destination terminal may display a prompt box to prompt the user of the destination terminal to select any quantity of media streams from all the media streams that are currently sent to the destination terminal, to stop receiving, and use, as the second target media stream based on a selection instruction of the user, a media stream selected by the user. When the media reception end request message is sent to the mission critical service server, the media reception end request message carries the media stream identifier of the second target media stream selected by the user. In particular, if the user does not select any media stream to stop receiving, the destination terminal ignores the received media reception end message, and may further return a response message to the mission critical service server, to instruct the destination terminal to reject the media reception end message.

In another possible case, the remote media reception end message carries the media stream identifier of the second target media stream, and then, the media reception end message may also include the media stream identifier of the second target media stream. Then, after receiving the media reception end message, the destination terminal may display a prompt box to inquire whether the user of the destination terminal stops receiving the second target media stream. When receiving an acknowledgment end reception instruction sent by the user, the destination terminal determines to stop receiving the second target media stream currently sent by the mission critical service server, and the destination terminal performs step S3022. When receiving no acknowledgment end reception instruction sent by the user, the destination terminal may return the response message to the mission critical service server, to indicate that the destination terminal rejects the media reception end message.

It should be noted that, in the implementation scenario shown in FIG. 3b, after performing step S3021, the destination terminal may immediately respond to the media reception end notification message, so as to perform step S3022, or after a period of time after performing step S3021, the destination terminal initiates the media reception end request message, so as to perform step S3022. This is not specifically limited herein.

Step S303. The mission critical service server stops sending the second target media stream to the destination terminal.

After determining the second target media stream, the mission critical service server may stop sending the second target media stream to the destination terminal corresponding to the target user identifier. In a possible implementation scenario, if the mission critical service server temporarily suspends the second target media stream, the mission critical service server may store the transmission context of the second target media stream that is sent to the destination terminal. When the transmission context of the second target media stream may be used to subsequently restart transmission of the second target media stream, the mission critical service server directly sends the second target media stream to the destination terminal without a need to establish the communication connection and the media negotiation again.

Optionally, in the implementation scenario shown in FIG. 3a, step S303 may include the following step.

Step S3031. The mission critical service server sends the media reception end notification message to the destination terminal based on the remote media reception end message.

The media reception end notification message is a message that may be used to notify the destination terminal to stop receiving the second target media stream, in other words, the mission critical service server is to stop sending the media stream to the destination terminal. Optionally, the media reception end message may include the user identifier of the second authorized user, so as to notify the user of the destination terminal that the second authorized user stops sending the media stream.

In a possible implementation scenario, there is a preset first quantity threshold for a quantity of receiving terminals that receive the second target media stream. The mission critical service server starts sending the second target media stream to each receiving terminal only when the quantity of the receiving terminals that receive the second target media stream reaches the first quantity threshold, or after a destination user serving as a mandatory user to which the second target media stream is sent uses the destination terminal to start receiving the second target media stream. When the quantity of the receiving terminals that receive the second target media stream does not reach the first quantity threshold, or when a destination user serving as a mandatory user to which the second target media stream is sent does not use the destination terminal to start receiving the second target media stream, the mission critical service server stops transmitting the second target media stream. Then, after step S303, the method may further include the following step.

Step S304. If a quantity of receiving terminals of the second target media stream is currently less than a first quantity threshold, or a destination user corresponding to the target user identifier is a mandatory user to which the second target media stream is sent, the mission critical service server sends a media transmission end message to a source terminal of the second target media stream, where the media transmission end message is used to notify the source terminal of the second target media stream to stop sending the second target media stream.

After stopping sending the second target media stream to the destination terminal, the mission critical service server may count the current quantity of the receiving terminals of the second target media stream. If the quantity of the receiving terminals of the second target media stream is less than the first quantity threshold, or a destination user corresponding to the target user identifier is a mandatory user to which the second target media stream is sent, it means that a current case cannot meet a requirement of the mission critical service server for transmitting the second target media stream. Then, the mission critical service server may send the media transmission end message to the source terminal of the second target media stream, and the media transmission end message is used to notify the source terminal of the second target media stream to stop sending the second target media stream to the mission critical service server. Specifically, the mission critical service server may actively release a connection to the source terminal of the second target media stream, so as to stop receiving the second target media stream. Alternatively, the source terminal of the second target media stream may determine and start, based on the media transmission end message, to stop receiving the second target media stream.

Further, after step S304, the method may further include the following step.

Step S305. The mission critical service server sends a media stream transmission end notification message to a current receiving terminal of the second target media stream.

The transmission end notification message is used to notify the receiving terminal of the second target media stream that transmission of the second target media stream stops, and there may be a plurality of receiving terminals of the second target media stream herein. The transmission end notification message may further include a reason for stopping transmitting the second target media stream, for example, the quantity of the receiving terminals of the second target media stream is less than the first quantity threshold.

Optionally, after step S303, the method may further include the following step.

Step S306. The mission critical service server sends a media stream transmission end response message to the second authorized terminal.

The media stream transmission end response message is used to notify the second authorized user that stopping transmission of the second target media stream has been responded to, and may carry the media stream identifier of the second target media stream.

In the embodiments shown in FIG. 3a and FIG. 3b, the mission critical service server receives the remote media reception end message sent by the authorized user, where the remote media reception message includes the target user identifier, then determines, based on the remote media reception end message, the second target media stream from the media streams that are currently sent to the destination terminal corresponding to the target user identifier, and stops sending the second target media stream to the destination terminal corresponding to the target user identifier, so that the authorized user may specify a second target media stream that stops being transmitted and a destination terminal receiving the second target media stream, so as to stop or suspend transmission of a specific media stream for a terminal of a specific communication participant.

Referring to FIG. 4a to FIG. 4d, FIG. 4a to FIG. 4d are schematic flowcharts of four media downlink transmission preemption methods according to embodiments of this application. A method provided in this embodiment may be further implemented based on the embodiments shown in FIG. 2a to FIG. 3b, or may be independently implemented.

Figure 4A:
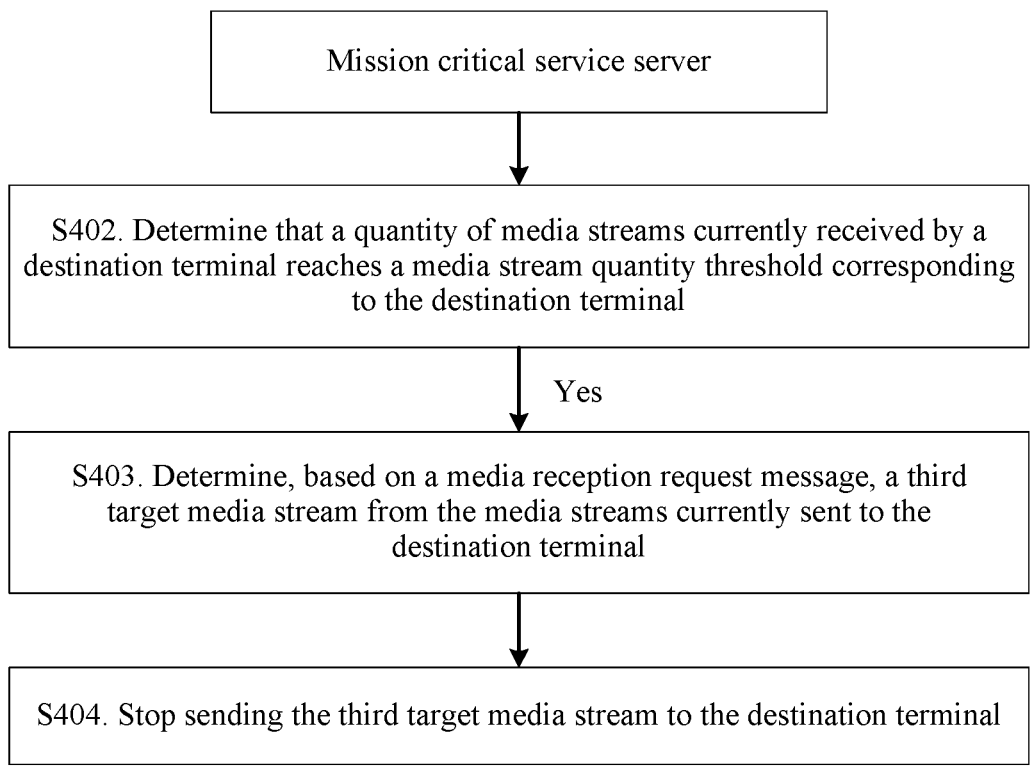
FIG. 4a is a schematic flowchart of a media downlink transmission preemption method according to an embodiment of this application.

In an implementation scenario shown in FIG. 4a, the method may include the following steps.

Step S402. A mission critical service server determines whether a quantity of media streams currently received by a destination terminal reaches a media stream quantity threshold corresponding to the destination terminal. If the quantity of the media streams currently received by the destination terminal reaches the threshold of the quantity of the media streams corresponding to the destination terminal, steps S404 and S405 are performed.

In the implementation scenario shown in FIG. 4a, the mission critical service server may monitor in real time whether the quantity of the media streams currently received by the destination terminal reaches the threshold of the quantity of the media streams corresponding to the destination terminal. If the quantity of the media streams currently received by the destination terminal does not reach the threshold of the quantity of the media streams, it indicates that the destination terminal currently may further receive the media stream, and steps S404 and S405 do not need to be performed. If the quantity of the media streams currently received by the destination terminal reaches the threshold of the quantity of the media streams, it indicates that a current media transmission resource of the destination terminal is in a saturated state, and steps S404 and S405 may be performed, to choose to stop transmitting one of the media streams that are being sent, so as to provide a transmission resource for subsequent media stream reception.

Step S403. The mission critical service server determines a third target media stream from the media streams currently sent to the destination terminal.

In the implementation scenario shown in FIG. 4a, the mission critical service server may randomly determine at least one third target media stream, or may determine at least one third target media stream based on a media stream attribute of each currently sent media stream, and this is not specifically limited herein.

Step S404. Stop sending the third target media stream to the destination terminal.

After determining to preempt the third target media stream, the mission critical service server may stop sending the third target media stream to the destination terminal.

Figure 4B:
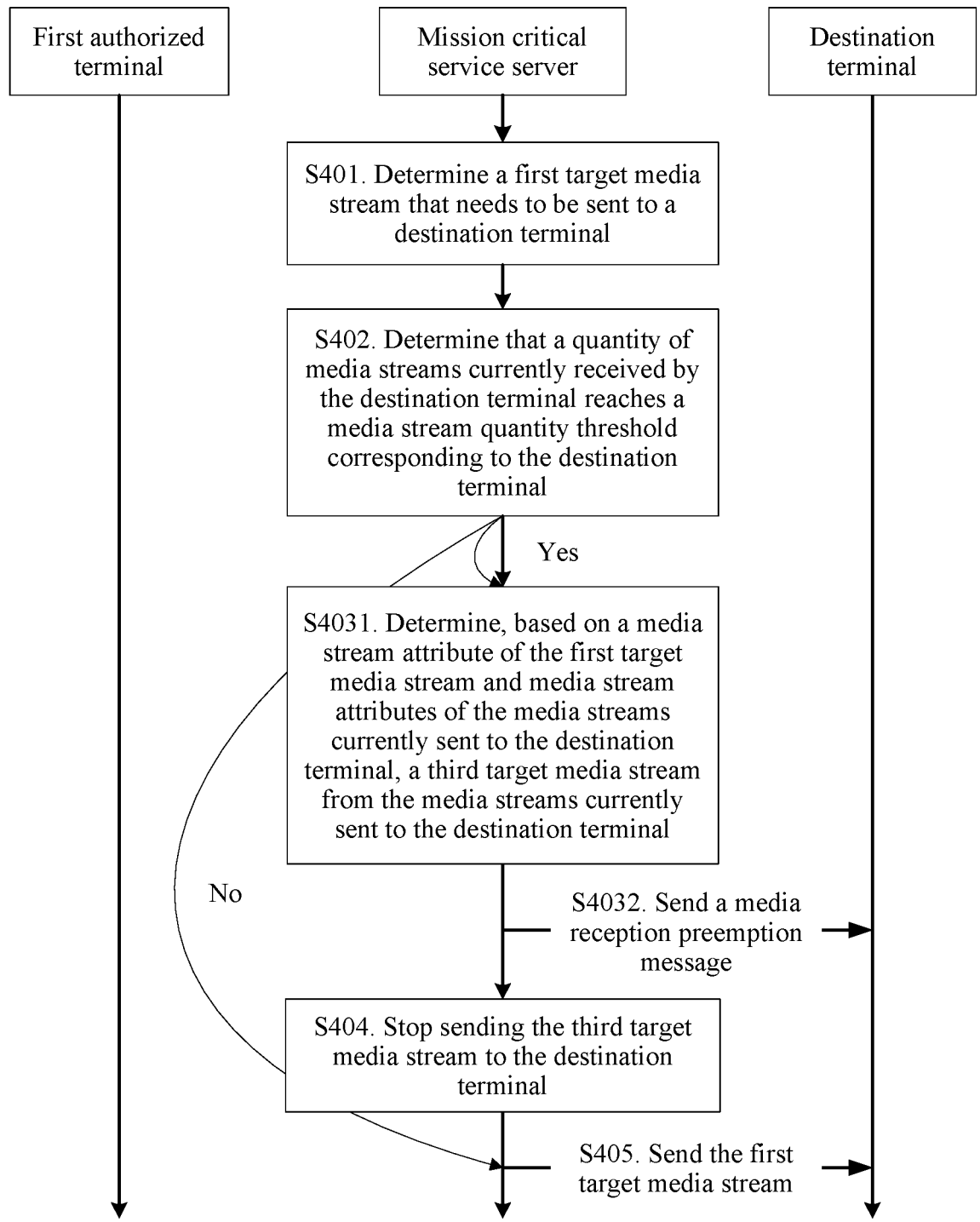
FIG. 4b is a schematic flowchart of another media downlink transmission preemption method according to an embodiment of this application.
Figure 4C:
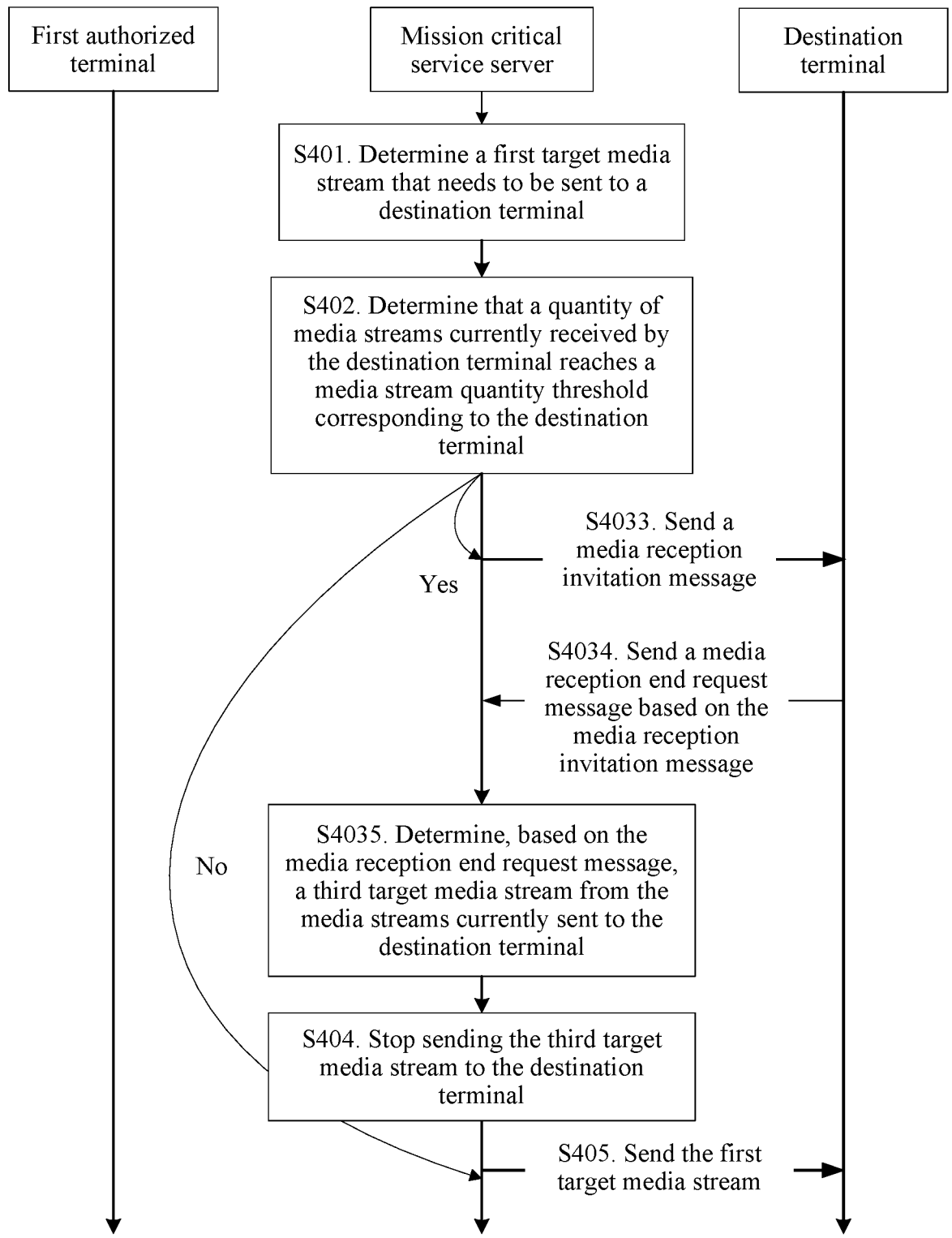
FIG. 4c is a schematic flowchart of another media downlink transmission preemption method according to an embodiment of this application.

In implementation scenarios shown in FIG. 4b and FIG. 4c, the method may include the following steps.

Step S401. A mission critical service server determines a first target media stream that needs to be sent to the destination terminal.

In some possible implementation scenarios, the mission critical service server needs to send the first target media stream to the destination terminal. The first target media stream herein may be requested by an authorized terminal to be sent to the destination terminal, or may be a first target media stream sending program that is preset or scheduled by the server, or may be a request of the destination terminal, and this is not specifically limited herein.

Step S402. The mission critical service server determines whether a quantity of media streams currently received by the destination terminal reaches a media stream quantity threshold corresponding to the destination terminal. If the quantity of the media streams currently received by the destination terminal reaches the threshold of the quantity of the media streams corresponding to the destination terminal, steps S403 to S405 are performed. If the quantity of the media streams currently received by the destination terminal does not reach the threshold of the quantity of the media streams corresponding to the destination terminal, step S405 is performed.

Before sending the first target media stream to the destination terminal, the mission critical service server may determine whether the quantity of the media streams currently received by the destination terminal reaches the threshold of the quantity of the media streams corresponding to the destination terminal. If the quantity of the media streams currently received by the destination terminal does not reach the threshold of the quantity of the media streams, it indicates that the destination terminal currently may further receive the media stream, and step S405 may be performed. If the quantity of the media streams currently received by the destination terminal reaches the threshold of the quantity of the media streams, it indicates that the destination terminal currently cannot receive more media streams. Therefore, if still needing to send the first target media stream to the destination terminal, the mission critical service server needs to preempt another transmission resource to continue sending the first target media stream, to be specific, stops transmission of some media streams to make idle for transmitting the first target media stream. In other words, steps S403 to S405 are performed.

Step S403. The mission critical service server determines a third target media stream from the media streams currently sent to the destination terminal.

In an implementation scenario shown in FIG. 4b, the mission critical service server determines whether to preempt the another transmission resource, and determines the preempted third target media stream after determining the preemption. Therefore, step S403 may be specifically as follows.

Step S4031. The mission critical service server determines, based on a media stream attribute of the first target media stream and media stream attributes of the media streams currently sent to the destination terminal, the third target media stream from the media streams currently sent to the destination terminal.

The media stream attribute may be at least one feature or type of the media stream, for example, the media stream attribute may include a priority of a media stream sending terminal, a service type (MCPTT or MCVideo) of the media stream, a criticalness type of the media stream, a call type (a private call or a group call) of the media stream, an arrival time sequence of the media stream, or transmission duration of the media stream. The mission critical service server may determine, based on any combination of the foregoing media stream attributes, the third target media stream from the media streams currently sent to the destination terminal. For example, there are three media streams currently sent to the destination terminal: a first media stream, a second media stream, and a third media stream. It is assumed that the mission critical service server determines a media stream with a lower criticalness type in a plurality of media streams as the third target media stream. It is assumed that the first media stream is a criticalness type media stream, and the second media stream and the third media stream are non-criticalness type media streams. Then, the mission critical service server may determine any one of the second media stream and the third media stream as the third target media stream.

Further, in the implementation scenario shown in FIG. 4b, after step S4031, the method may further include the following step.

Step S4032. The mission critical service server sends a media reception preemption message to the destination terminal.

The media reception preemption message is a notification message used to notify the destination terminal that the third target media stream that is currently being transmitted is preempted, and may include a media stream identifier of the preempted third target media stream. Optionally, the media reception preemption message may further include a preemption reason, and further include an identifier of the first target media stream, indicating that the second target media stream is preempted by the first media stream.

Further, the media reception preemption message may further indicate that the preempted third target media stream is suspended or stopped. In a possible implementation scenario, the media reception preemption message indicates that the third target media stream is suspended, and then, it indicates that the mission critical service server and the destination terminal retain a transmission context of the third target media stream. When a reception capability of the destination terminal subsequently permits, the mission critical service server may actively continue to send the suspended third target media stream, without waiting for the destination terminal to initiate a reception request again for receiving the third target media stream. In another possible implementation scenario, the media reception preemption message indicates that the third target media stream is stopped, and then, it indicates that the mission critical service server and the destination terminal do not retain the transmission context of the third target media stream. When the reception capability of the destination terminal subsequently permits, the mission critical service server does not actively send the stopped third target media stream to the destination terminal, but waits for the destination terminal to initiate the request again for receiving the third target media stream.

In an implementation scenario shown in FIG. 4c, a user of the destination terminal determines whether to preempt the another transmission resource, and determines the preempted third target media stream after determining the preemption. Therefore, step S403 may specifically include the following step.

Step S4033. The mission critical service server sends a media reception invitation message to the destination terminal.

The media reception invitation message is an instruction message used to notify the destination terminal to receive a media stream. In this embodiment of this application, the media reception invitation message may carry a media stream identifier of the first target media stream, so as to instruct the destination terminal to receive the first target media stream that is to be transmitted.

Step S4034. The destination terminal sends a media reception end request message to the mission critical service server based on the media reception invitation message.

After receiving the reception invitation message, the destination terminal may determine whether the quantity of the media streams currently received by the destination terminal reaches the threshold of the quantity of the media streams corresponding to the destination terminal. In a possible case, after determining that the quantity of the currently received media streams reaches the threshold of the quantity of the media streams, the destination terminal may display a prompt box to inquire whether the user of the destination terminal receives the first target media stream. When receiving an acknowledgment reception instruction sent by the user, the destination terminal displays a prompt box to prompt the user to select some of the media streams currently received by the destination terminal to perform preemption, in other words, determines that a preempted media stream selected by the user is the third target media stream. In another possible case, after determining that the quantity of the media streams currently simultaneously received reaches the threshold of the quantity of the media streams, the destination terminal may also determine, based on the media stream attribute of the first target media stream and the media stream attributes of the media streams currently received by the destination terminal, the third target media stream from the media streams currently received by the destination terminal.

After determining the third target media stream, the destination terminal may send the media reception end request message to the mission critical service server, where the media reception end request message carries the media stream identifier of the third target media stream, so as to instruct the mission critical service server to preempt the third target media stream.

Step S4035. The mission critical service server determines, based on the media reception end request message, the third target media stream from the media streams currently sent to the destination terminal.

The mission critical service server determines the third target media stream based on the media stream identifier of the third target media stream in the media reception end request message.

Figure 4D:
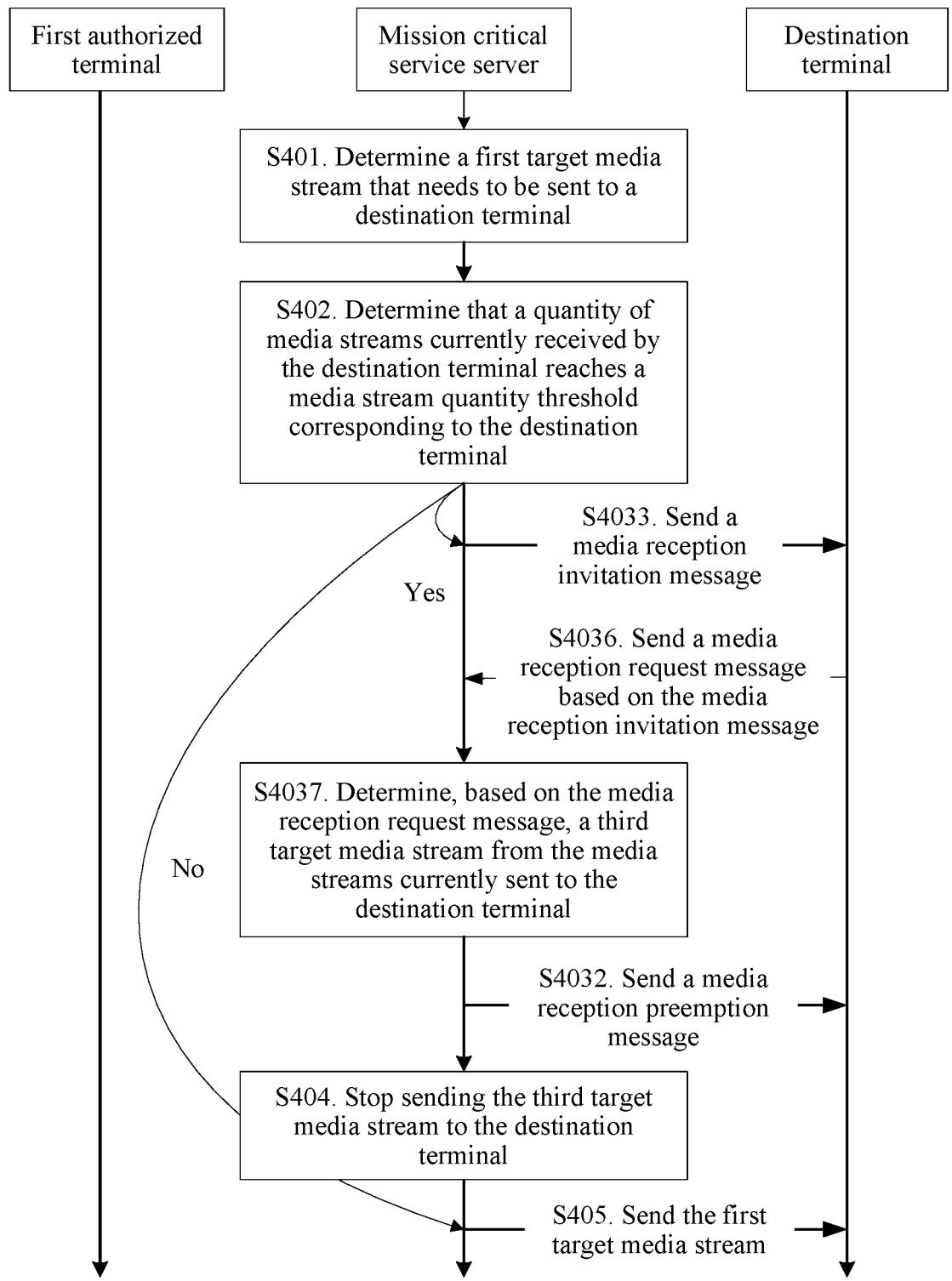
FIG. 4d is a schematic flowchart of another media downlink transmission preemption method according to an embodiment of this application.

In an implementation scenario shown in FIG. 4d, the user of the destination terminal only determines whether to preempt the another transmission resource, and the mission critical service server determines the preempted third target media stream. Therefore, step S403 may specifically include the following steps.

Step S4033. The mission critical service server sends the media reception invitation message to the destination terminal, where the media reception invitation message carries a media stream identifier of the first target media stream.

Step S4036. The destination terminal sends a media reception request message to the mission critical service server based on the media reception invitation message.

After receiving the reception invitation message, the destination terminal may determine whether the quantity of the media streams currently simultaneously received by the destination terminal reaches the threshold of the quantity of the media streams corresponding to the destination terminal. After determining that the quantity of media streams currently simultaneously received reaches the threshold of the quantity of the media streams, the destination terminal may display the prompt box to inquire whether the user of the destination terminal receives the first target media stream. When receiving the acknowledgment reception instruction sent by the user, the destination terminal determines that the user determines to receive the first target media stream, and sends the media reception request message to the mission critical service server, so that the mission critical service server determines the third target media stream that needs to be preempted.

Step S4037. The mission critical service server determines, based on the media reception request message, the third target media stream from the media streams currently sent to the destination terminal.

After receiving the media reception request message, the mission critical service server may determine, based on the media stream attribute of the first target media stream and the media stream attributes of the media streams currently sent to the destination terminal, the third target media stream from the media streams currently sent to the destination terminal.

Further, in the implementation scenario shown in FIG. 4d, after step S4037, the method may further include the following steps.

Step S4032. The mission critical service server sends the media reception preemption message to the destination terminal.

Step S404. The mission critical service server stops sending the third target media stream to the destination terminal.

After determining to preempt the third target media stream, the mission critical service server may stop sending the third target media stream to the destination terminal.

Step S405. The mission critical service server sends the first target media stream to the destination terminal.

For a description of this part, refer to the descriptions in the embodiments shown in FIG. 2a and FIG. 2b.

In the embodiments shown in FIG. 4a to FIG. 4d, if the quantity of the media streams currently received by the destination terminal reaches the threshold of the quantity of the media streams corresponding to the destination terminal, the mission critical service server determines the third target media stream from the media streams currently sent to the destination terminal, and stops sending the third target media stream to the destination terminal. Therefore, when the quantity of the received media streams reaches the threshold of the quantity of the media streams, the destination terminal may receive a newly transmitted media stream in a manner of stopping occupying some transmission resources.

Figure 5A:
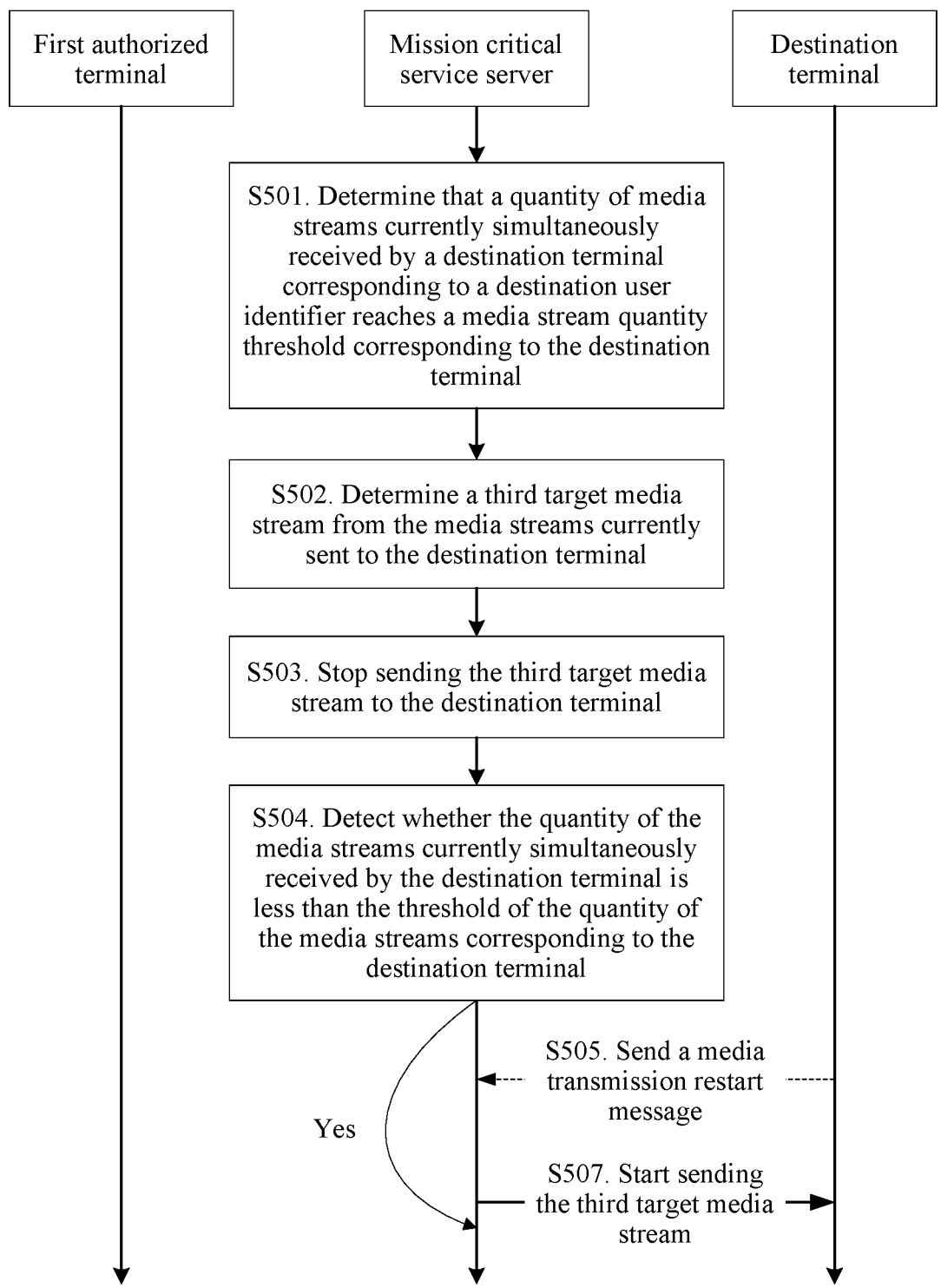
FIG. 5a is a schematic flowchart of a media downlink transmission restart method according to an embodiment of this application.
Figure 5B:
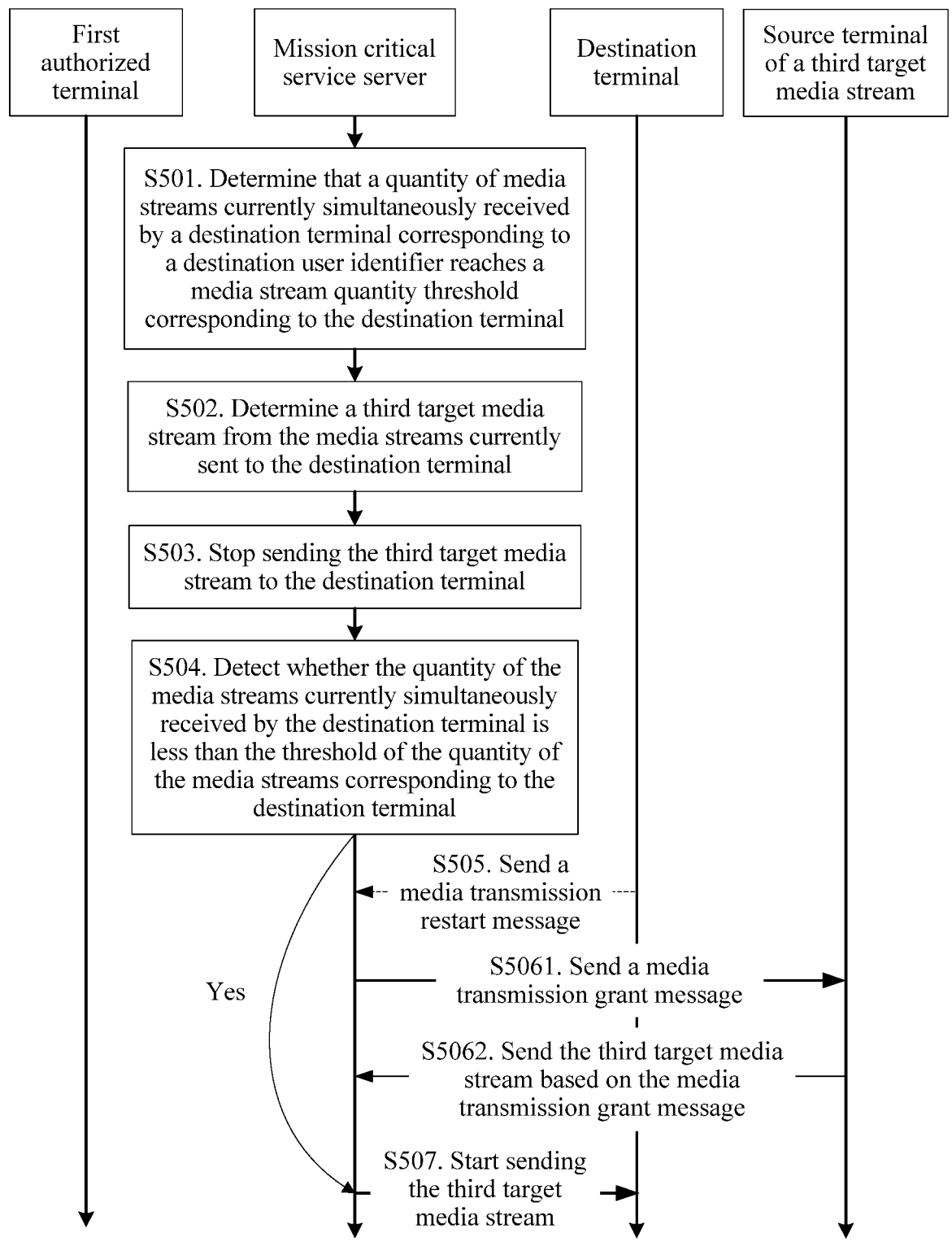
FIG. 5b is a schematic flowchart of another media downlink transmission restart method according to an embodiment of this application.

Based on the embodiments shown in FIG. 4a to FIG. 4d, after stopping sending a third target media stream to a destination terminal, a mission critical service server may further restart transmission of the third target media stream. Referring to FIG. 5a and FIG. 5b, FIG. 5a and FIG. 5b are schematic flowcharts of two media downlink transmission restart methods according to embodiments of this application. The method includes the following steps.

Step S501. A mission critical service server determines that a quantity of media streams currently simultaneously received by a destination terminal reaches a media stream quantity threshold corresponding to the destination terminal.

Step S502. The mission critical service server determines a third target media stream from the media streams currently sent to the destination terminal.

Step S503. The mission critical service server stops sending the third target media stream to the destination terminal.

Step S504. The mission critical service server detects whether the quantity of the media streams currently received by the destination terminal is less than the threshold of the quantity of the media streams corresponding to the destination terminal. If the quantity of the media streams currently received by the destination terminal is less than the threshold of the quantity of the media streams corresponding to the destination terminal, step S507 is performed.

After stopping sending the third target media stream to the destination terminal, the mission critical service server may continue to detect whether the quantity of the media streams currently received by the destination terminal is less than the threshold of the quantity of the media streams corresponding to the destination terminal. When detecting that the quantity of the media streams currently received by the destination terminal is less than the threshold of the quantity of the media streams, the mission critical service server may trigger and restart the transmission of the third target media stream.

Step S507. The mission critical service server starts sending the third target media stream to the destination terminal.

In an implementation scenario shown in FIG. 5a, the mission critical service server stores a transmission context of the third target media stream. When detecting that the destination terminal currently has an idle transmission resource, the mission critical service server may directly restart the transmission of the third target media stream, in other words, start sending the third target media stream to the destination terminal.

In an implementation scenario shown in FIG. 5b, the mission critical service server does not store the transmission context of the third target media stream. Then, before step S507, step S5061 and step S5062 may further be performed.

Step S5061. The mission critical service server sends a media transmission grant message to a source terminal of the third target media stream.

The media transmission grant message is a control message used to instruct the source terminal of the third target media stream to send a media stream to the mission critical service server.

Step S5062. The source terminal of the third target media stream sends the third target media stream to the mission critical service server based on the media transmission grant message.

After receiving the media transmission grant message, the source terminal of the third target media stream may determine, based on the media transmission grant message, the third target media stream that needs to be sent, so as to send the third target media stream to the mission critical service server.

Optionally, before step S507, the method may further include the following step.

Step S505. The destination terminal sends a media transmission restart message to the mission critical service server.

The media transmission restart message is used to instruct the mission critical service server to retransmit the previously stopped media stream to the destination terminal. The media transmission restart message may carry a media stream identifier of the third target media stream, and is used to request to start transmitting the third target media stream.

In the embodiments shown in FIG. 5a and FIG. 5b, if the quantity of the media streams currently received by the destination terminal reaches the threshold of the quantity of the media streams corresponding to the destination terminal, the mission critical service server determines the third target media stream from the media streams currently sent to the destination terminal, stops sending the third target media stream to the destination terminal, and starts sending the third target media stream to the destination terminal when detecting that the quantity of the media streams currently received by the destination terminal is less than the threshold of the quantity of the media streams corresponding to the destination terminal. Therefore, when the destination terminal can receive the media stream, the mission critical service server may directly start sending the third target media stream to the destination terminal, reducing signaling overheads, and improving user experience of a destination terminal user.

Figure 6:
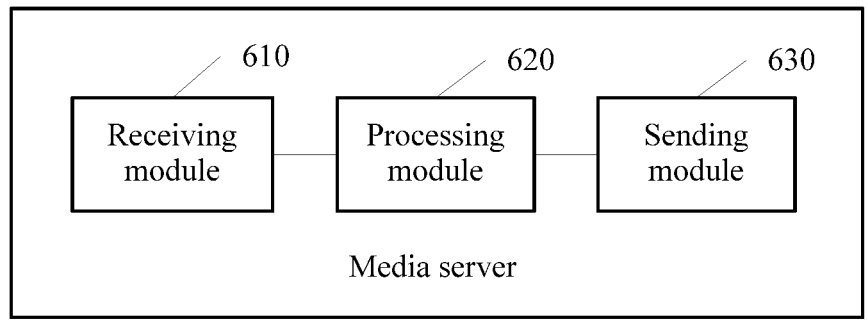
FIG. 6 is a schematic structural diagram of a media server according to an embodiment of this application.

Referring to FIG. 6, FIG. 6 is a schematic structural diagram of a media server according to an embodiment of this application. As shown in FIG. 6, the media server includes a receiving module 610, configured to receive a remote media reception message sent by an authorized terminal, where the remote media reception message includes a target user identifier, a processing module 620, configured to determine a first target media stream based on the remote media reception message, and a sending module 630, configured to send the first target media stream to a destination terminal corresponding to the target user identifier.

Optionally, the processing module 620 is further configured to determine whether a quantity of media streams currently received by the destination terminal is less than a media stream quantity threshold corresponding to the destination terminal, and if the quantity of the media streams currently received by the destination terminal is less than the threshold of the quantity of the media streams corresponding to the destination terminal, notify the sending module 630 to send the first target media stream to the destination terminal corresponding to the target user identifier.

Optionally, the sending module 630 is further configured to send a media reception invitation message to the destination terminal, where the media reception invitation message is used to notify the destination terminal to receive the first target media stream.

The receiving module 610 is further configured to receive a media reception request message that is sent by the destination terminal based on the media reception invitation message, and trigger, based on the media reception request message, the sending module 630 to send the first target media stream to the destination terminal corresponding to the target user identifier.

In the embodiment shown in FIG. 6, the media server receives the remote media reception message sent by the authorized terminal, where the remote media reception message includes the target user identifier, then determines the first target media stream based on the remote media reception message, and sends the first target media stream to the destination terminal corresponding to the target user identifier, so that the authorized user may specify a sent first target media stream and a destination terminal receiving the first target media stream, so as to send a specific media stream to a terminal of a specific communication participant.

Figure 7:
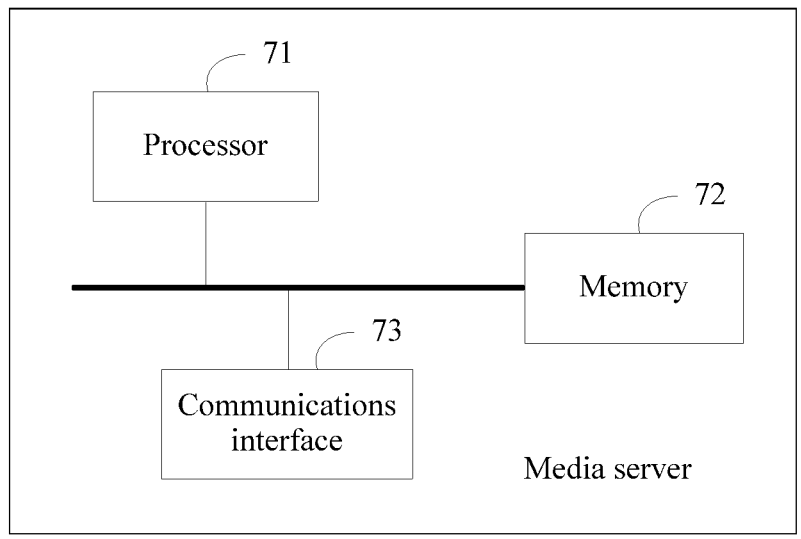
FIG. 7 is a schematic structural diagram of another media server according to an embodiment of this application.

Referring to FIG. 7, FIG. 7 is a schematic structural diagram of another media server according to an embodiment of this application. As shown in FIG. 7, the device includes a processor 71, a memory 72, and a communications interface 73. The processor 71 is connected to the memory 72 and the communications interface 73. For example, the processor 71 may be connected to the memory 72 and the communications interface 73 by using a bus.

The processor 71 is configured to support the media server in performing corresponding functions in the methods in FIG. 2a and FIG. 2b. The processor 71 may be a central processing unit (CPU), a network processor (NP), a hardware chip or any combination thereof. The hardware chip may be an application-specific integrated circuit (ASIC), a programmable logic device (PLD), or a combination thereof. The PLD may be a complex programmable logical device (CPLD), a field-programmable gate array (FPGA), generic array logic (GAL), or any combination thereof.

The memory 72 is configured to store program code and the like. The memory 72 may include a volatile memory, for example, a random access memory (RAM). The memory 72 may also include a non-volatile memory, for example, a read-only memory (ROM), a flash memory, a hard disk drive (HDD), or a solid-state drive (SSD). The memory 72 may further include a combination of the foregoing types of memories.

The communications interface 73 is configured to communicate with each terminal in this embodiment of this application, so as to receive or transmit a message or a media stream provided in the foregoing methods.

The processor 71 may invoke the program code to perform the following operations: receiving, by using the communications interface 73, a remote media reception message sent by an authorized terminal, where the remote media reception message includes a target user identifier, determining a first target media stream based on the remote media reception message, and sending, by using the communications interface 73, the first target media stream to a destination terminal corresponding to the target user identifier.

Optionally, before sending, by using the communications interface 73, the first target media stream to the destination terminal corresponding to the target user identifier, the processor 71 is further configured to determine that a quantity of media streams currently received by the destination terminal is less than a media stream quantity threshold corresponding to the destination terminal.

Optionally, the remote media reception message further includes a media stream identifier of the first target media stream.

Optionally, before sending, by using the communications interface 73, the first target media stream to the destination terminal corresponding to the target user identifier, the processor 71 is further configured to send a media reception invitation message to the destination terminal by using the communications interface 73, where the media reception invitation message is used to notify the destination terminal to receive the first target media stream, and receive, by using the communications interface 73, a media reception request message that is sent by the destination terminal based on the media reception invitation message.

Optionally, after sending, by using the communications interface 73, the first target media stream to the destination terminal corresponding to the target user identifier, the processor 71 is further configured to after sending the first target media stream to the destination terminal, send a media stream transmission completion notification message to the authorized user by using the communications interface 73.

Figure 8:
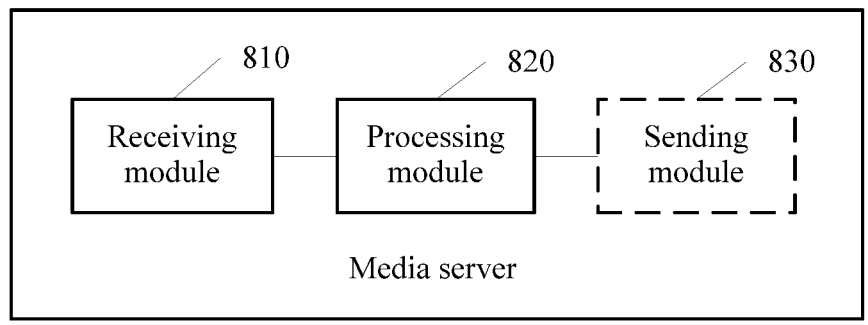
FIG. 8 is a schematic structural diagram of another media server according to an embodiment of this application.

Referring to FIG. 8, FIG. 8 is a schematic structural diagram of a media server according to another embodiment of this application. As shown in FIG. 8, the media server includes a receiving module 810, configured to receive a remote media reception end message sent by an authorized terminal, where the remote media reception message includes a target user identifier, and a processing module 820, configured to determine, based on the remote media reception end message, a second target media stream from media streams that are currently sent to a destination terminal corresponding to the target user identifier.

The processing module 820 is further configured to stop sending the second target media stream to the destination terminal corresponding to the target user identifier.

Optionally, the media server further includes a sending module 830, configured to send a media reception end notification message to the destination terminal based on the remote media reception end message, where the media reception end notification message is used to notify the destination terminal that a mission critical service server currently stops sending the second target media stream to the destination terminal.

Optionally, the receiving module 810 is further configured to receive a media reception end request message that is sent by the destination terminal based on the media reception end notification message, where the media reception end request message carries a media stream identifier of the second target media stream.

The processing module 820 is further configured to stop, based on the media reception end request message, sending the second target media stream to the destination terminal corresponding to the target user identifier.

The sending module 830 is further configured to send a media reception end response message to the destination terminal.

In the embodiment shown in FIG. 8, the media server receives the remote media reception end message sent by the authorized user, where the remote media reception message includes the target user identifier, then determines, based on the remote media reception end message, the second target media stream from the media streams that are currently sent to the destination terminal corresponding to the target user identifier, and stops sending the second target media stream to the destination terminal corresponding to the target user identifier, so that the authorized user may specify a second target media stream that stops being transmitted and a destination terminal receiving the second target media stream, so as to stop or suspend transmission of a specific media stream for a terminal of a specific communication participant.

Figure 9:
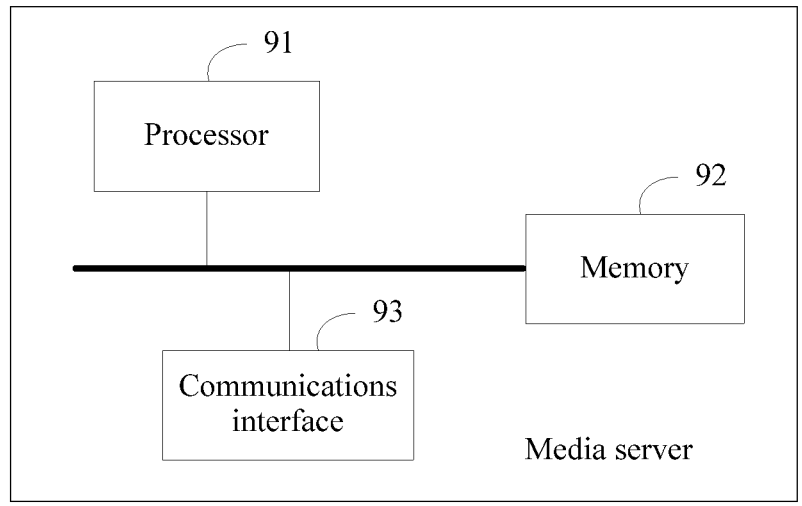
FIG. 9 is a schematic structural diagram of another media server according to an embodiment of this application.

Referring to FIG. 9, FIG. 9 is a schematic structural diagram of another media server according to an embodiment of this application. As shown in FIG. 9, the device includes a processor 91, a memory 92, and a communications interface 93. The processor 91 is connected to the memory 92 and the communications interface 93. For example, the processor 91 may be connected to the memory 92 and the communications interface 93 by using a bus.

The processor 91 is configured to support the media server in performing corresponding functions in the methods in FIG. 3a and FIG. 3b. The processor 91 may be a central processing unit (CPU), a network processor (NP), a hardware chip or any combination thereof. The hardware chip may be an application-specific integrated circuit (ASIC), a programmable logic device (PLD), or a combination thereof. The PLD may be a complex programmable logical device (CPLD), a field-programmable gate array (FPGA), generic array logic (GAL), or any combination thereof.

The memory 92 is configured to store program code and the like. The memory 92 may include a volatile memory, for example, a random access memory (RAM). The memory 92 may also include a non-volatile memory, for example, a read-only memory (ROM), a flash memory, a hard disk drive (HDD), or a solid-state drive (SSD). The memory 92 may further include a combination of the foregoing types of memories.

The communications interface 93 is configured to communicate with each terminal in this embodiment of this application, so as to receive or transmit a message or a media stream provided in the foregoing methods.

The processor 91 may invoke the program code to perform the following operations: receiving, by using the communications interface 93, a remote media reception end message sent by an authorized terminal, where the remote media reception end message includes a target user identifier, determining, based on the remote media reception end message, a second target media stream from media streams that are currently sent to a destination terminal corresponding to the target user identifier, and stopping sending, by using the communications interface 93, the second target media stream to a destination terminal corresponding to the target user identifier.

Optionally, after stopping sending the second target media stream to the destination terminal corresponding to the target user identifier, the processor 91 is further configured to if a quantity of receiving terminals of the second target media stream is currently less than a first quantity threshold, or a destination user corresponding to the target user identifier is a mandatory user to which the second target media stream is sent, send a media transmission end message to a source terminal of the second target media stream by using the communications interface 93, where the media transmission end message is used to notify the source terminal of the second target media stream to stop sending the second target media stream.

Optionally, the remote media reception end message further includes a media stream identifier of the second target media stream.

Optionally, before stopping sending the second target media stream to the destination terminal corresponding to the target user identifier, the processor 91 is further configured to send a media reception end notification message to the destination terminal based on the remote media reception end message and by using the communications interface 93, where the media reception end notification message is used to notify the destination terminal that a mission critical service server currently stops sending the second target media stream to the destination terminal.

Optionally, that the processor 91 determines, based on the remote media reception end message, the second target media stream from the media streams that are currently sent to the destination terminal corresponding to the target user identifier specifically includes receiving, by using the communications interface 93, a media reception end request message that is sent by the destination terminal based on the media reception end notification message, where the media reception end request message carries the media stream identifier of the second target media stream.

The stopping sending, by using the communications interface 93, the second target media stream to a destination terminal corresponding to the target user identifier includes stopping sending, by using the communications interface 93, the second target media stream to the destination terminal corresponding to the target user identifier, and sending, by using the communications interface 93, a media reception end response message to the destination terminal.

Figure 10:
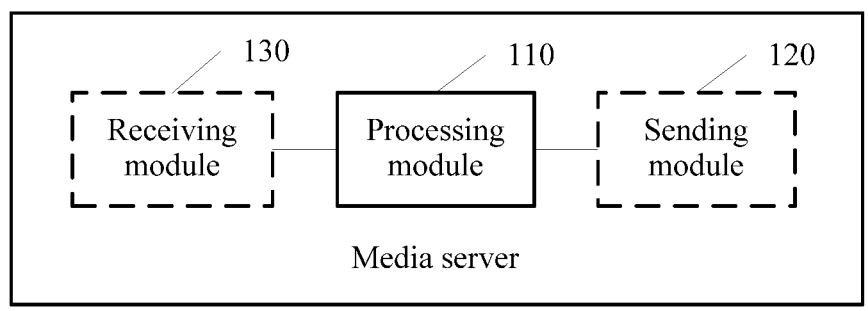
FIG. 10 is a schematic structural diagram of another media server according to an embodiment of this application.

Referring to FIG. 10, FIG. 10 is a schematic structural diagram of a media server according to another embodiment of this application. As shown in FIG. 10, the media server includes a processing module 110, configured to when a quantity of media streams currently received by the destination terminal reaches a media stream quantity threshold corresponding to the destination terminal, determine a third target media stream from the media streams currently sent to the destination terminal.

The processing module 110 is further configured to stop sending the third target media stream to the destination terminal.

Optionally, the processing module 110 is further configured to determine a first target media stream that needs to be sent to the destination terminal.

Optionally, the media server further includes a sending module 120, configured to send a media reception preemption message to the destination terminal, where the media reception preemption message carries identification information of the first media stream and identification information of the third media stream, and the media reception preemption message is used to notify the destination terminal that a transmission resource of the third media stream is used to transmit the first media stream.

Optionally, the media server further includes a sending module 120, configured to send a media reception invitation message to the destination terminal, where the media reception invitation message carries a media stream identifier of the first target media stream, and a receiving module 130, configured to receive a media reception end request message that is sent by the destination terminal based on the media reception invitation message, and the processing module no is configured to determine, based on the media reception end request message, the third target media stream from the media streams currently sent to the destination terminal.

Optionally, the processing module no is further configured to when it is detected that the quantity of the media streams currently received by the destination terminal is less than the threshold of the quantity of the media streams corresponding to the destination terminal, start sending the third target media stream to the destination terminal.

Optionally, the media server further includes a receiving module 130, configured to receive a media transmission restart message sent by the destination terminal, and trigger, based on the media transmission restart message, the sending module 120 to start sending the third target media stream to the destination terminal.

In the embodiment shown in FIG. 10, if the quantity of the media streams currently received by the destination terminal reaches the threshold of the quantity of the media streams corresponding to the destination terminal, the media server determines the third target media stream from the media streams currently sent to the destination terminal, and stops sending the third target media stream to the destination terminal. Therefore, when the quantity of the received media streams reaches the threshold of the quantity of the media streams, the destination terminal may receive a newly transmitted media stream in a manner of stopping occupying some transmission resources.

Figure 11:
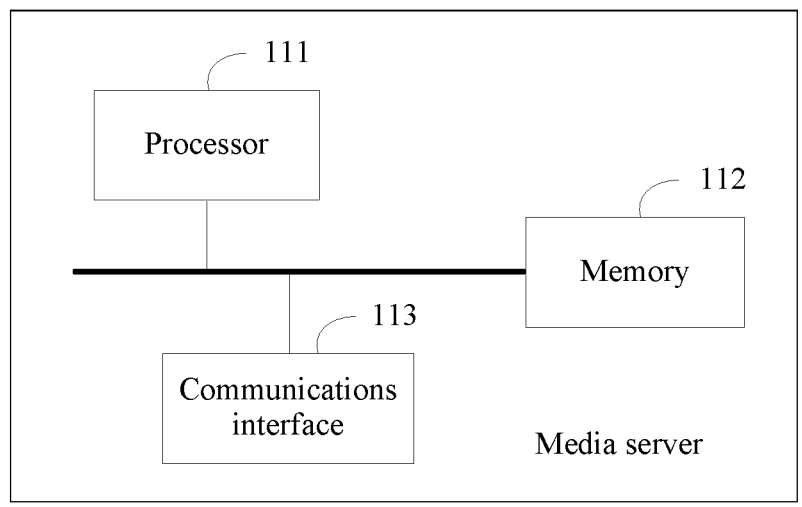
FIG. 11 is a schematic structural diagram of another media server according to an embodiment of this application.

Referring to FIG. 11, FIG. 11 is a schematic structural diagram of another media server according to an embodiment of this application. As shown in FIG. 11, the device includes a processor 111, a memory 112, and a communications interface 113. The processor 111 is connected to the memory 112 and the communications interface 113. For example, the processor 111 may be connected to the memory 112 and the communications interface 113 by using a bus.

The processor 111 is configured to support the media server in performing corresponding functions in the methods in FIG. 4a to FIG. 5b. The processor 111 may be a central processing unit (CPU), a network processor (NP), a hardware chip or any combination thereof. The hardware chip may be an application-specific integrated circuit (ASIC), a programmable logic device (PLD), or a combination thereof. The PLD may be a complex programmable logical device (CPLD), a field-programmable gate array (FPGA), generic array logic (GAL), or any combination thereof.

The memory 112 is configured to store program code and the like. The memory 112 may include a volatile memory, for example, a random access memory (RAM). The memory 112 may also include a non-volatile memory, for example, a read-only memory (ROM), a flash memory, a hard disk drive (HDD), or a solid-state drive (SSD). The memory 112 may further include a combination of the foregoing types of memories.

The communications interface 113 is configured to communicate with each terminal in this embodiment of this application, so as to receive or transmit a message or a media stream provided in the foregoing methods.

The processor 111 may invoke the program code to perform the following operations: if a quantity of media streams currently received by a destination terminal reaches a media stream quantity threshold corresponding to the destination terminal, determining a third target media stream from the media streams currently sent to the destination terminal, and stopping sending the third target media stream to the destination terminal.

Optionally, before determining the third target media stream from the media streams currently sent to the destination terminal, the processor 111 is further configured to determine a first target media stream that needs to be sent to the destination terminal.

Optionally, before stopping sending the third target media stream to the destination terminal corresponding to the target user identifier, the processor 111 is further configured to send a media reception preemption message to the destination terminal by using the communications interface 113, where the media reception preemption message carries identification information of the first media stream and identification information of the third media stream, and the media reception preemption message is used to notify the destination terminal that a transmission resource of the third media stream is used to transmit the first media stream.

Optionally, that the processor 91 determines the third target media stream from the media streams currently sent to the destination terminal includes sending a media reception invitation message to the destination terminal by using the communications interface 113, where the media reception invitation message carries a media stream identifier of the first target media stream, receiving, by using the communications interface 113, a media reception end request message that is sent by the destination terminal based on the media reception invitation message, and determining, based on the media reception end request message, the third target media stream from the media streams currently sent to the destination terminal.

Optionally, the media reception end request message carries a media stream identifier of the third target media stream.

Optionally, after stopping sending the third target media stream to the destination terminal corresponding to the target user identifier, the processor 111 is further configured to when it is detected that the quantity of the media streams currently received by the destination terminal is less than the threshold of the quantity of the media streams corresponding to the destination terminal, start sending the third target media stream to the destination terminal.

Optionally, before starting sending the third target media stream to the destination terminal, the processor 111 is further configured to receive a media transmission restart message sent by the destination terminal.

Optionally, the media transmission restart message carries the media stream identifier of the third target media stream, and is used to request to start transmitting the third target media stream.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include a magnetic disk, an optical disc, a read-only memory (ROM), or a random access memory (RAM).

What are disclosed above are merely example embodiments of this application, and certainly are not intended to limit the protection scope of this application. Therefore, equivalent variations made in accordance with the claims of this application shall fall within the scope of this application.

What is claimed is:

1. A method, comprising:
   determine, by a media server, a first target media stream to be sent to a destination terminal;
   in response to a quantity of media streams currently received by the destination terminal reaching a media stream quantity threshold corresponding to the destination terminal, determining, by the media server, a second target media stream from the media streams to stop sending to the destination terminal;
   sending, by the media server, a media reception preemption message to the destination terminal, wherein the media reception preemption message carries identification information of the first target media stream and identification information of the second target media stream, and the media reception preemption message notifies the destination terminal that the second target media stream will be overridden by the first target media stream; and stopping sending, by the media server, the second target media stream to the destination terminal, and sending the first target media stream to the destination terminal.

2. The method according to claim 1, wherein determining the second target media stream from the media streams comprises:
sending a media reception invitation message to the destination terminal, wherein the media reception invitation message carries a media stream identifier of the first target media stream;
receiving a media reception end request message that is sent by the destination terminal based on the media reception invitation message; and
determining, based on the media reception end request message, the second target media stream from the media streams.

3. The method according to claim 2, wherein the media reception end request message carries a media stream identifier of the second target media stream.

4. The method according to claim 1, further comprising:
after stopping the sending the second target media stream to the destination terminal, and in response to detecting that the quantity of the media streams currently received by the destination terminal is less than the media stream quantity threshold, resuming sending, by the media server, the second target media stream to the destination terminal.

5. The method according to claim 4, further comprising:
before resuming sending the second target media stream to the destination terminal, receiving, by the media server, a media transmission restart message sent by the destination terminal.

6. The method according to claim 5, wherein the media transmission restart message carries a media stream identifier of the second target media stream, and the media transmission restart message requests to resume sending the second target media stream.

7. A media server, comprising:
a transceiver;
a processor; and
a non-transitory computer-readable storage medium storing a program to be executed by the processor, the program including instructions to:
determine a first target media stream to be sent to a destination terminal;
in response to a quantity of media streams currently received by the destination terminal reaching a media stream quantity threshold corresponding to the destination terminal, determine a second target media stream from the media streams to stop sending to the destination terminal;
cause the transceiver to send a media reception preemption message to the destination terminal, wherein the media reception preemption message carries identification information of the first target media stream and identification information of the second target media stream, and the media reception preemption message notifies the destination terminal that the second target media stream will be overridden by the first target media stream; and
stop sending the second target media stream to the destination terminal, and send the first target media stream to the destination terminal.

8. The media server according to claim 7, wherein the program further includes instructions to:
cause the transceiver to send a media reception invitation message to the destination terminal, wherein the media reception invitation message carries a media stream identifier of the first target media stream;
receive, through the transceiver, a media reception end request message that is sent by the destination terminal based on the media reception invitation message; and
determine, based on the media reception end request message, the second target media stream from the media streams.

9. The media server according to claim 8, wherein the media reception end request message carries a media stream identifier of the second target media stream.

10. The media server according to claim 7, wherein the program further includes instructions to:
in response to detecting that the quantity of the media streams currently received by the destination terminal is less than the media stream quantity threshold corresponding to the destination terminal, resume sending the second target media stream to the destination terminal.

11. The media server according to claim 10, wherein the program further includes instructions to:
receive, through the transceiver, a media transmission restart message sent by the destination terminal; and
trigger, based on the media transmission restart message, the transceiver to resume sending the second target media stream to the destination terminal.

12. A non-transitory medium, comprising instructions which, when executed by a computer, cause the computer to:
determine a first target media stream to be sent to a destination terminal;
in response to a quantity of media streams currently received by the destination terminal reaching a media stream quantity threshold corresponding to the destination terminal, determine a second target media stream from the media streams to stop sending to the destination terminal;
send a media reception preemption message to the destination terminal, wherein the media reception preemption message carries identification information of the first target media stream and identification information of the second target media stream, and the media reception preemption message notifies the destination terminal that the second target media stream will be overridden by the first target media stream; and
stop sending the second target media stream to the destination terminal, and sending the first target media stream to the destination terminal.

13. The medium according to claim 12, wherein the instructions further cause the computer to:
send a media reception invitation message to the destination terminal, wherein the media reception invitation message carries a media stream identifier of the first target media stream;
receive a media reception end request message that is sent by the destination terminal based on the media reception invitation message; and
determine, based on the media reception end request message, the second target media stream from the media streams.

14. The medium according to claim 13, wherein the media reception end request message carries a media stream identifier of the second target media stream.

* * * * *